(12) United States Patent
Nishikawa et al.

(10) Patent No.: US 7,252,345 B2
(45) Date of Patent: Aug. 7, 2007

(54) BRAKE SYSTEM FOR A MOTORCYCLE

(75) Inventors: Yutaka Nishikawa, Saitama (JP); Kazuhiko Tani, Saitama (JP); Takuya Tagami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 11/041,532

(22) Filed: Jan. 24, 2005

(65) Prior Publication Data

US 2005/0168062 A1 Aug. 4, 2005

(30) Foreign Application Priority Data

Jan. 30, 2004 (JP) .............................. 2004-024044

(51) Int. Cl.
*B60T 8/42* (2006.01)
(52) U.S. Cl. ..................... 303/115.2; 303/3; 303/20
(58) Field of Classification Search ............... 303/9.64, 303/20, 113.1, 115.1, 115.2, 115.4, 115.5, 303/3
See application file for complete search history.

(56) References Cited

U.S. PATENT DOCUMENTS

| | | | | | |
|---|---|---|---|---|---|
| 4,753,490 | A | * | 6/1988 | Belart et al. ............. | 303/115.4 |
| 5,836,659 | A | * | 11/1998 | Feigel et al. ............. | 303/115.2 |
| 5,941,608 | A | * | 8/1999 | Campau et al. .......... | 303/115.4 |
| 6,139,119 | A | * | 10/2000 | Otomo .................... | 303/113.1 |
| 6,347,518 | B1 | * | 2/2002 | Kingston et al. ............. | 60/552 |
| 6,464,306 | B2 | * | 10/2002 | Shaw et al. ..................... | 303/3 |
| 6,494,547 | B2 | * | 12/2002 | Higashimura et al. ... | 303/115.1 |
| 6,543,859 | B2 | * | 4/2003 | Sakamoto ................. | 303/113.2 |
| 6,585,332 | B2 | * | 7/2003 | Kusano et al. ........... | 303/113.4 |
| 6,672,685 | B2 | * | 1/2004 | Ishimura et al. ......... | 303/113.4 |
| 7,008,023 | B2 | * | 3/2006 | Nakashima et al. ...... | 303/114.1 |
| 2005/0162010 | A1 | * | 7/2005 | Kamiya et al. .......... | 303/113.4 |
| 2005/0168060 | A1 | * | 8/2005 | Tani et al. ................. | 303/9.62 |
| 2005/0168063 | A1 | * | 8/2005 | Tani et al. ................ | 303/113.5 |

FOREIGN PATENT DOCUMENTS

JP 05039008 A 2/1993

* cited by examiner

*Primary Examiner*—Thomas Williams
(74) *Attorney, Agent, or Firm*—Carrier, Blackman & Associates, P.C.; William D. Blackman; Joseph P. Carrier

(57) ABSTRACT

A combined braking system in which communicative connection a master cylinder and a brake caliper is cut off by an electromagnetic on-off valve, and hydraulic pressure, corresponding to driving conditions and a braking operation, is generated by an electrically-operated actuator of a hydraulic pressure modulator. Hydraulic pressure of the hydraulic pressure modulator operates on the brake caliper, whereas a psuedo-reaction force which has been generated by a reaction force modulator operates on the master cylinder. The reaction force modulator is configured to include: a fluid chamber for receiving hydraulic fluid which has flowed therein from the master cylinder; a piston to constitute a wall of the fluid chamber; and a metal-made coil spring and a deformed plastic resin spring, both of which apply a force to the piston. The braking system provides a braking operation having a smooth feeling which is similar to that given by a direct-operation-type brake system.

14 Claims, 16 Drawing Sheets

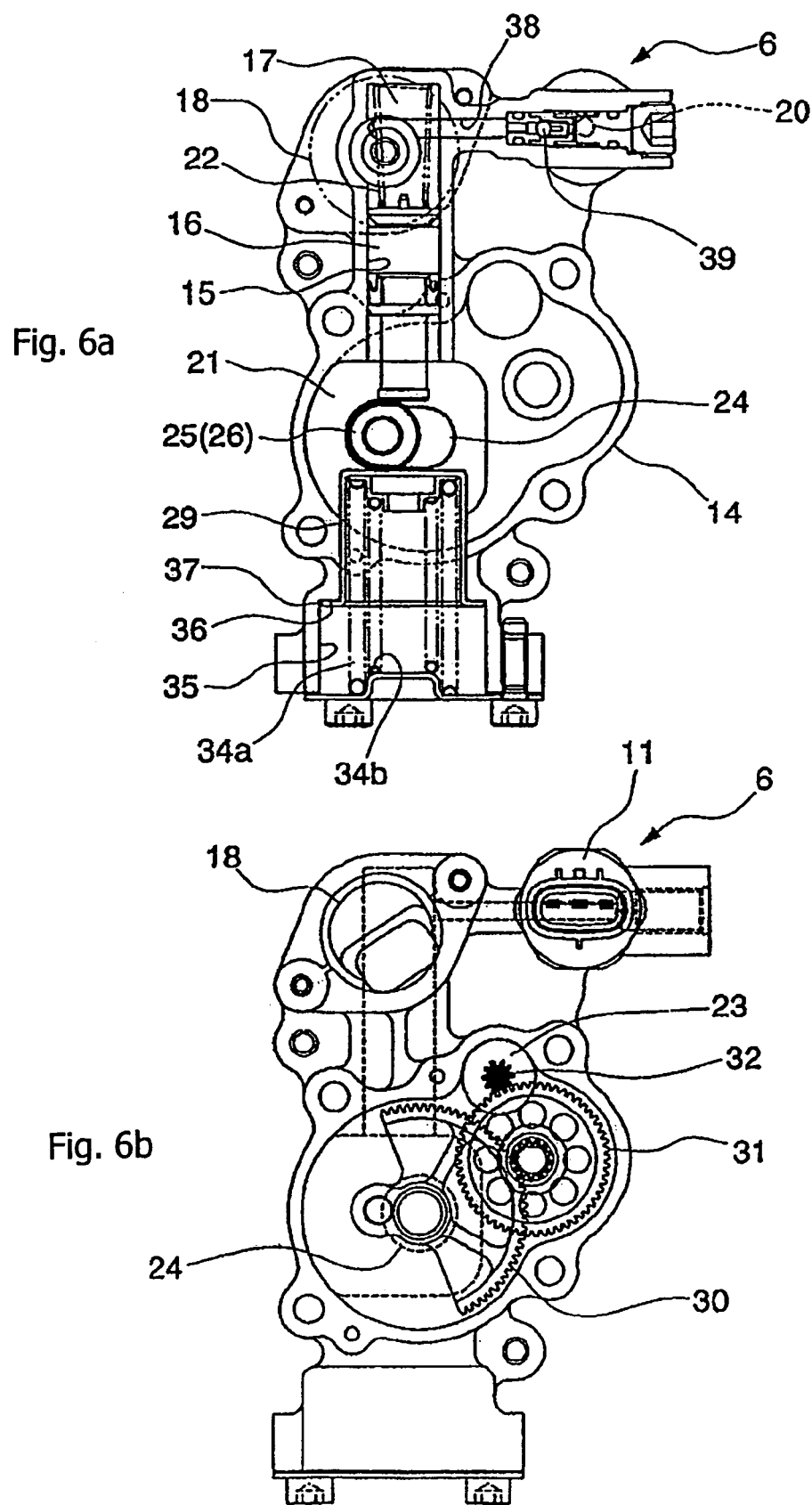

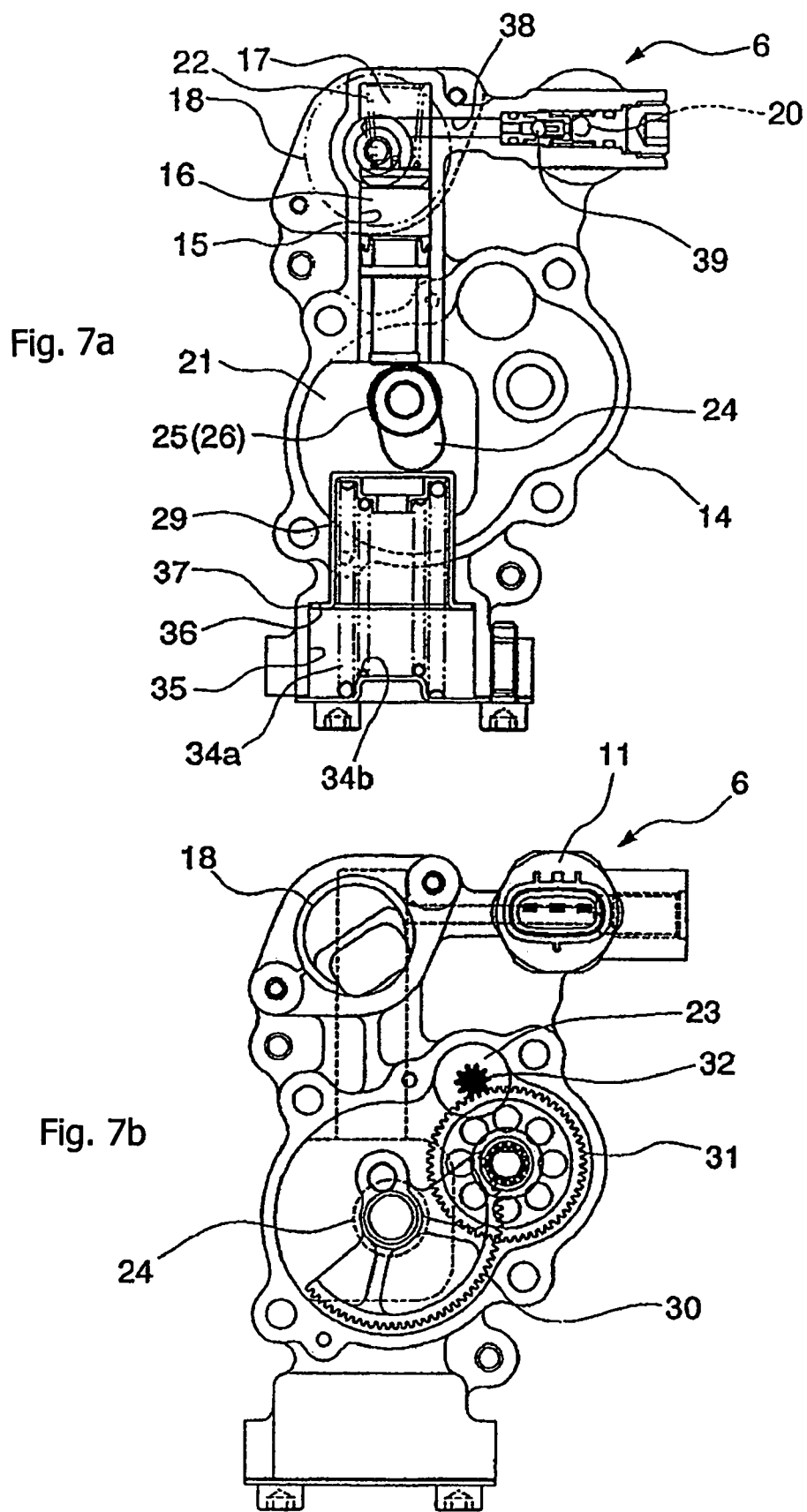

PRIOR ART

BRAKE SYSTEM FOR A MOTORCYCLE

CROSS-REFERENCE TO RELATED APPLICATIONS

The present invention claims priority under 35 USC 119 based on Japanese patent application No. 2004-024044, filed on Jan. 30, 2004. The subject matter of these priority documents is incorporated by reference herein.

BACKGROUND OF THE INVENTION

1. Field of the Invention

The present invention relates to a brake system for a motorcycle. It particularly relates to a brake system for a motorcycle which causes hydraulic pressure generated by an electrically-operated actuator to function on wheel braking mechanism depending on driving conditions and a braking operation of the motorcycle. The brake system can simultaneously cause a pseudo-reaction force to function on a brake operation apparatus.

2. Description of the Background Art

A brake system employing what is called a by-wire method (hereinafter referred to as a "by-wire method") is known in the art. According to this type of brake system, an amount of operation of a brake operation lever, such as a hand lever or foot pedal, is detected electrically. Based on the detected value, the wheel braking mechanism, such as a wheel caliper, is operated by hydraulic pressure which has been generated by a hydraulic pressure modulator. An example of this type of brake system is described in Japanese Patent Laid-open Official Gazette No. Hei. 5-39008. The brake system disclosed in Japanese Patent Laid-open Official Gazette No. Hei. 5-39008 has the following schematic configuration.

Specifically, with regard to this type of brake system, a hydraulic pressure modulator which generates hydraulic pressure by use of an electric pump (electrically-operated actuator), a reservoir, a control valve and the like are merged and connected with a main brake line connecting wheel cylinders (wheel braking mechanism) of the respective wheels and a master cylinder which moves in response to a brake pedal (brake operation lever). In addition, a normally-open-type electromagnetic on-off valve is provided in a position in the main brake line. The position of the electromagnetic on-off valve is located toward the master cylinder from a portion in which the main brake line and the hydraulic pressure modulator are connected with each other. The electromagnetic on-off valve is a fail safe device. The electromagnetic on-off valve is energized, and blocks the path between the electromagnetic valve and the master cylinder, while a regular braking operation is performed. In addition, hydraulic pressure is generated by the hydraulic pressure modulator. The hydraulic pressure is generated corresponding to a detection value which has been found by electrically detecting an amount of operation of the brake pedal, and to other driving conditions of the vehicle.

Furthermore, this type of brake system is provided with a reaction force modulator. The reaction force modulator causes a pseudo reaction force against the hydraulic pressure to function on the master cylinder corresponding to an amount of operation of the brake pedal, while the electromagnetic on-off valve shuts off the main brake line. Thereby, this type of brake system is designed provide a braking operation which transmits a smooth feel to the toes of a driver in accompaniment to operation of the brake pedal.

The reaction force modulator includes a fluid chamber which receives hydraulic fluid which flows into from the master cylinder. The fluid chamber is separated and formed by a piston and a cylinder. The piston is energized by a single coil spring in a direction which causes the piston to reduce the volume of the fluid chamber. In the reaction force modulator, reaction force against hydraulic pressure corresponding to displacement of the coil spring always functions on the master cylinder.

With regard to this conventional type of brake system, however, the reaction force against hydraulic pressure to be generated by the reaction force modulator is provided by the single coil spring. For this reason, it is difficult for this type of brake system to give the driver a braking operation in which the feel is not ragged, and to give the driver a braking operation in which the feel is similar to that generated by a brake system which directly operates a wheel braking unit by use of pressure generated by a master cylinder (hereinafter referred to as a "direct-operation-type brake system"). In other words, with regard to the direct-operation-type brake system, a moderate rise of reaction force continues during a predetermined length of stroke in an initial phase of braking operation, and a relatively steep rise of reaction force is caused along with some degree of damping resistance after the stoke exceeds the predetermined length. However, it is virtually impossible for characteristics of this kind to be reflected on a braking operation feel by reaction force caused by a reaction force modulator having only a single coil spring.

In addition, it is conceivable that use of an electric servo mechanism or the like in the reaction force modulator would reproduce operational reaction force which is similar to that generated by the direct-operation-type brake system. However, forming a reaction force modulator which includes such devices leads to a larger size and heavier weight of the brake system. This is not suitable especially for a motorcycle which is required to be smaller in size and light in weight.

Furthermore, in the aforementioned conventional brake system, an electromagnetic on-off valve (channel switching valve) is installed in the fluid path which connects the master cylinder and the reaction force modulator so that the electromagnetic on-off valve is interposed between the master cylinder and the reaction force modulator. The conventional brake system is designed to cause the electromagnetic on-off valve to control flow of hydraulic fluid into the reaction force modulator. In this system, however, the flow of the hydraulic fluid from the master cylinder into the reaction force modulator, and return of the hydraulic fluid from the reaction force modulator into the master cylinder, are always carried out through the same single path. For this reason, the electromagnetic on-off valve sometimes closes the path before the hydraulic fluid has been completely returned from the reaction force modulator into the master cylinder, depending on operating conditions of the electromagnetic on-off valve. In this case, a feeling of changed braking operation is apprehended the next time the brake system is operated.

With this taken into consideration, it is an object of the present invention to provide a brake system for a motorcycle which provides a feeling of braking operation which is similar to that given by the direct-operation-type brake system, to be obtained even though the brake system is designed to operate the wheel braking mechanism by use of the by-wire method.

SUMMARY OF THE INVENTION

According to a first aspect of the invention, in order to achieve the aforementioned object, a brake system for a motorcycle includes a master cylinder to move in response to operation of a brake operation lever such as a hand lever or foot pedal. The brake system also includes wheel braking mechanism for applying a braking force to a wheel by hydraulic pressure operation. The brake system has a main brake line that connects the master cylinder to the wheel braking mechanism, and a hydraulic pressure modulator for causing an electrically-operated actuator to generate hydraulic pressure corresponding to driving conditions and a braking operation of the vehicle. The hydraulic pressure modulator also supplies the hydraulic pressure to the main brake line and discharges the hydraulic pressure from the main brake line, and is merged and connected with the main brake line. The brake system includes an electromagnetic on-off valve which is provided in a position located toward the master cylinder from a portion in the main brake line where the main brake line and the hydraulic pressure modulator are merged and connected with each other. The electromagnetic on-off valve for controls communication and cutoff between the master cylinder and the wheel braking mechanism. A reaction force modulator is also included in the brake system for causing pseudo-reaction force against the hydraulic pressure corresponding to an amount of operation of the brake operation lever to function on the master cylinder whenever necessary while the electromagnetic on-off valve closes the main brake line.

In the brake system for a motorcycle, the reaction force modulator is configured to include a fluid chamber for receiving hydraulic fluid received from the master cylinder, a piston which constitutes one of the walls of the fluid chamber and a plurality of elastic members. The plurality of elastic members have characteristics which are different from one elastic member to another, and are used to apply a force to the piston in a direction which causes the piston to reduce the volume of the fluid chamber.

In a case where the reaction force modulator is configured in the aforementioned manner, when the electromagnetic on-off valve closes the main brake line so that hydraulic fluid corresponding to an amount of operation of the brake operation lever flows into the fluid chamber of the reaction force modulator from the master cylinder, the piston constituting a wall of the fluid chamber retracts against a force applied by the elastic members. At this time, reaction force against the hydraulic pressure to function on the master cylinder is generated by the elastic members which apply a force to the piston. The combination of the elastic members is made up of the plurality of elastic members whose characteristics are different from one elastic member to another. For this reason, for example, a moderate rise of reaction force in the initial phase of braking operation can be generated by the characteristics of one of the elastic members, and the subsequent steep rise of the reaction force and damping resistance can be generated by the characteristics of the rest of the elastic members.

In a second aspect of the invention, if, for example, the combination of the plurality of elastic members is constituted of a spring member having a linear spring characteristic and a spring member having a hysteresis characteristic, an arbitrary reaction force characteristic stemming from the combination of the rise characteristic and hysteresis characteristic of the reaction force can be obtained. For the aforementioned two types of spring members, for example, a spring member made of metallic material and a spring member made of plastic resin material can be adopted.

Moreover, a brake system according to another aspect of the invention has the same configuration as the brake system according to the first aspect of the invention, except for the following points. In this brake system, a path which connects the master cylinder and the reaction force modulator is provided with a second electromagnetic on-off valve for opening and closing the path depending on driving conditions and a braking operation to the vehicle. In addition, a bypass path which bypasses the second electromagnetic on-off valve is provided between the reaction force modulator and the master cylinder. Furthermore, the bypass path is provided with the check valve which allows hydraulic fluid to flow in a direction from the reaction force modulator to the master cylinder.

In a case where this configuration is adopted, when the second electromagnetic on-off valve is opened while the communicative connection the master cylinder and the wheel braking mechanism is cut off, the master cylinder and the reaction force modulator are connected with each other so that hydraulic fluid flows into the reaction force modulator from the master cylinder. If the second electromagnetic on-off valve is caused to close before the master cylinder has completely returned from this state to an initial state, this blocks the main brake line connecting the master cylinder and the reaction force modulator. At this point, however, the check valve in the bypass path is opened so that excess hydraulic fluid, which remains in a unit to generate the reaction force, is returned to the side of the master cylinder.

According to the present invention, the reaction force modulator and the second electromagnetic on-off valve are provided into an integrated block. In a case where this configuration is adopted, the reaction force modulator and the second electromagnetic on-off valve are arranged in the integrated block in a compact manner.

The present invention is intended to cause a reaction force, which is generated by the plurality of elastic members whose characteristics are different from one elastic member to another, to function depending on stroke of the piston in the reaction force modulator. This allows construction of a smaller and lighter brake system, and simplifies the structure of the brake system. At the same time, this makes it possible to obtain a smooth braking operation feel which is similar to that given by the direct-operation-type brake system.

According to the present invention, the spring member having a linear spring characteristic and the spring member having a hysteresis characteristic are combined, thereby making it possible to easily obtain an optional rise characteristic and hysteresis characteristic of the reaction force. This is advantageous due to increases in freedom of modification of the braking operation feel.

The present invention is further intended to obtain linear spring characteristics and hysteresis characteristics from a spring member made of metallic material and a spring member made of plastic resin material. This makes it possible to obtain a brake system with increased freedom in the modification of the feeling of braking operation while preventing an increase in manufacturing costs.

The present invention further enables hydraulic fluid to be returned to the master cylinder securely by causing the check valve to open the bypass path even while the excess hydraulic fluid remains in the reaction force modulator. This makes it possible to always obtain a braking operation having an appropriate physical feel which is similar to that given by the direct-operation-type brake system.

According to the present invention, the reaction force modulator and the second electromagnetic on-off valve are arranged in the single integrated block in a compact manner. This is advantageous since the brake system, and the motorcycle it is mounted on, is smaller in size and lighter in weight.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 6(a) is a sectional view of the hydraulic pressure modulator taken along the dashed line C—C in FIG. 4, which is not in operation, showing the piston in the neutral position.

FIG. 6(b) is a side view of the hydraulic pressure modulator of FIG. 6(a) as seen from the direction of the arrow B in FIG. 4, showing a transmission part of an electrically-operated motor.

FIG. 7(a) is a sectional view of the hydraulic pressure modulator taken along the dashed line C—C in FIG. 4, showing the hydraulic pressure chamber reduced in sized due to the upward movement of the piston as found when the braking system is under CBS control.

FIG. 7(b) is a side view of the hydraulic pressure modulator of FIG. 7(a) as seen from the direction of the arrow B in FIG. 4, showing a transmission part of an electrically-operated motor.

DETAILED DESCRIPTION OF THE INVENTION

Figure 1:
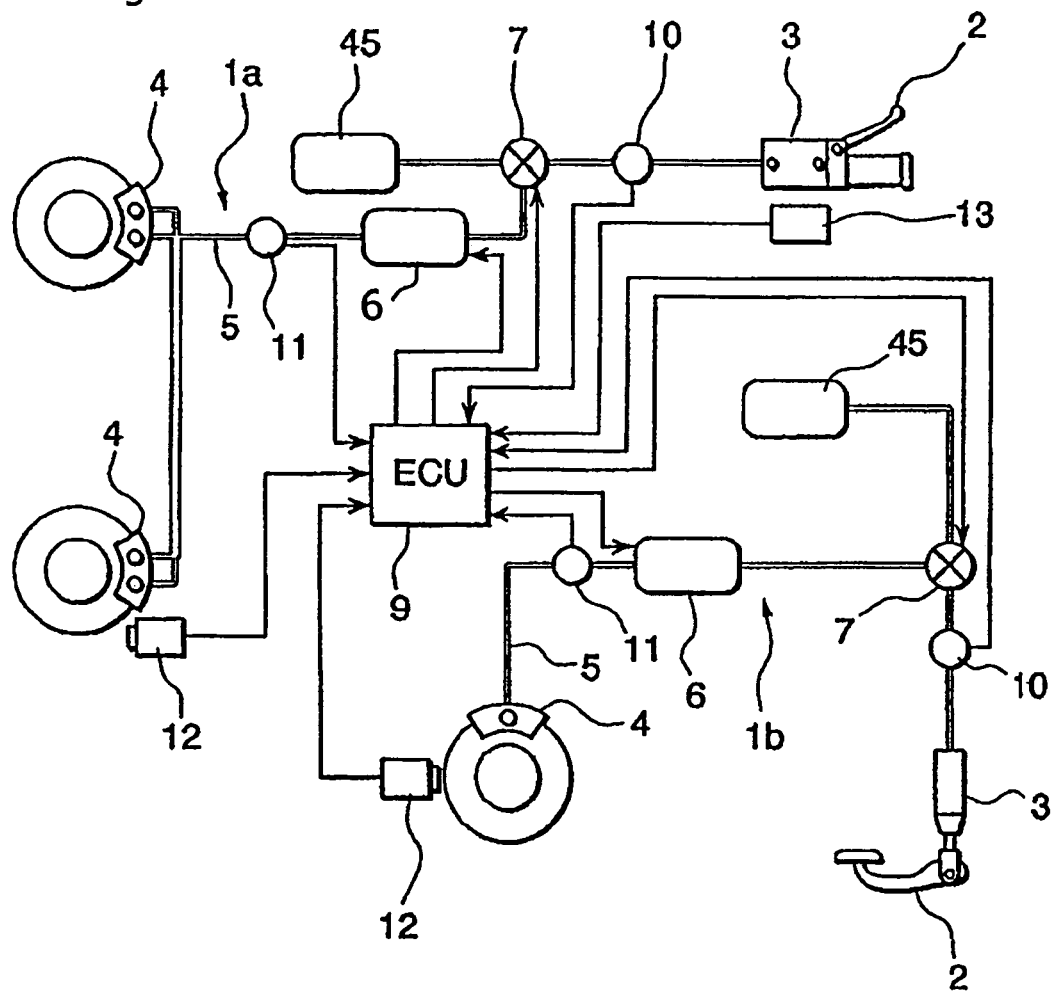
FIG. 1 is a schematic view of the combined brake system showing an embodiment of the present invention.
Figure 2:
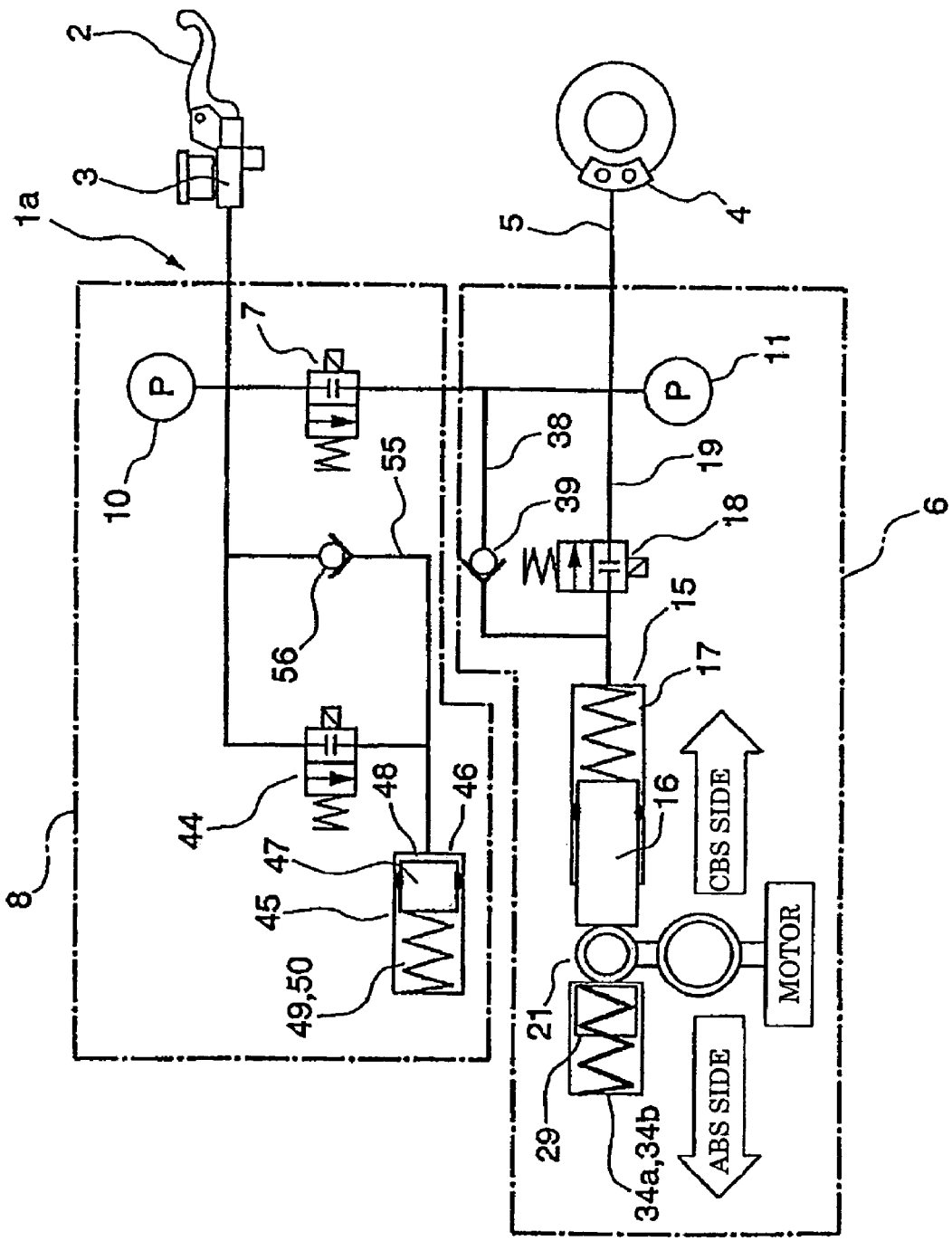
FIG. 2 is a schematic view of a braking circuit at a front wheel for the embodiment of FIG. 1.

Next, descriptions will be provided for an embodiment of the present invention with reference to the drawings. FIG. 1 shows an overall configuration of a brake system according to an embodiment of the present invention. The brake system according to the present embodiment includes a front wheel brake circuit 1a and a rear wheel brake circuit 1b which are independent of each other as shown in FIG. 1. According to the present embodiment, the front wheel brake circuit 1a and the rear wheel brake circuit 1b are different from each other in that a brake operation lever 2 for the front wheel employs a lever and a brake operation lever 2 for the rear wheel employs a pedal. Except for this, however, the front wheel brake circuit 1a and the rear wheel brake circuit 1b have almost the same basic configuration. In the following descriptions of the specific circuit configuration, detailed descriptions will be provided only for the front wheel brake circuit 1a. For the rear wheel brake circuit 1b, overlapped descriptions will be omitted by assigning the same reference numerals to the same components as has the front wheel brake circuit 1a.

In each of the brake circuits 1a and 1b, a master cylinder 3 moves in response to the brake operation lever 2. A brake caliper 4, which is the wheel braking mechanism corresponding to the master cylinder 3, is connected to master cylinder 3 through a main brake line 5. In a middle portion of the main brake line 5, a hydraulic pressure modulator 6 is merged and connected with the main brake line 5. The hydraulic pressure modulator 6 causes an electrically-operated actuator to generate hydraulic pressure, and is described below. In addition, a first normally-open electromagnetic on-off valve 7 is interposed between the master cylinder 3 and the brake caliper 4 in a position in the main brake line 5. The position is toward the master cylinder 3 from the position where the main brake line 5 and the hydraulic pressure modulator 6 are merged and connected with each other. The first electromagnetic on-off valve 7 controls the connection and cutoff between the master cylinder 3 and the brake caliper 4.

Each of the brake circuits 1a and 1b further include a reaction force modulator 45 connected to the main brake line 5. The reaction force modulator causes a pseudo reaction force against the hydraulic pressure to function on the master cylinder 3 corresponding to an amount of operation of the brake operation lever 2 upon necessity while the electromagnetic on-off valve 7 closes the main brake line 5. The electrically-operated actuator in the hydraulic pressure modulator 6 and the first electromagnetic on-off valve 7, along with other valves and equivalents included in the hydraulic pressure modulator 6 and the like, are designed to be electrically controlled by a controller (ECU) 9.

It should be noted that the controller 9 is connected with a pressure sensor 10 for detecting hydraulic pressure on the input side (the side in the direction of the master cylinder 3 from the first electromagnetic on-off valve 7) of each of the brake circuits 1a and 1b. The same controller 9 is connected with pressure sensor 11 for detecting hydraulic pressure on the output side (the side in the direction of the brake caliper 4 from the first electromagnetic on-off valve 7) of each of the brake circuits 1a and 1b. The same controller 9 is also connected with wheel speed sensors 12 for detecting the respective wheel speeds of the front and rear wheels. In addition, the same controller 9 is connected with a mode changing switch 13 and the like through which control modes are changed by a manual operation of the rider of the motorcycle. The same controller 9 controls the braking pressures of the respective brake calipers 4 depending on input signals from these sensors and signals for changing modes.

This type of brake system includes a combined brake system (CBS) having the following function: when any one of the brake operation lever 2 for the front wheel and the brake operation lever 2 for the rear wheel is operated, the CBS causes the brake caliper 4 corresponding to the other brake operation lever 2, to move in response to the operated brake operation lever 2. A brake caliper 4 associated with a brake operation lever 2 which was operated later than the other brake operation lever 2 is operated by pressure which has been supplied from the hydraulic pressure modulator, by use of a by-wire method.

In other words, when one of the two brake operation levers 2 is operated, information concerning the wheel speed of each of the front and rear wheels, an amount of the braking operation and the like is inputted into the controller 9 through the corresponding sensors. Thereafter, a command from the controller 9 causes the first electromagnetic on-off valve 7 in the brake circuit leading to the other of the two brake operation levers 2 to close the main brake line 5. Simultaneously with this, the hydraulic pressure modulator 6 supplies hydraulic pressure to the brake caliper 4 in the brake circuit depending on driving conditions and an amount of the braking operation. However, hydraulic pressure is supplied from the hydraulic pressure modulator 6 to the brake circuit leading to the brake operation lever which has not been operated in this manner, only when the mode changing switch 13, which will be described in detail later, is set at a mode which allows the CBS.

On the other hand, in the brake circuit leading to a brake operation lever 2 which has been operated earlier than the other brake operation lever 2, hydraulic pressure which has been generated in the master cylinder 3 is supplied directly to the brake caliper 4. In other words, when the controller 9 determines through the pressure sensors 10 that one brake operation lever 2 has been operated earlier than the other brake operation lever 2, the first electromagnetic on-off valve 7 is maintained in a non-energized condition. As a result, hydraulic pressure from the master cylinder 3 is supplied to the brake caliper 4 through the main brake line 5.

The CBS in this brake system controls hydraulic pressure in the brake circuit leading to the brake operation lever 2, which has been operated subsequent to the other brake operation lever 2, by use of the by-wire method. Consequently, this enables the front and rear wheel brakes to move in response to each other by use of the respective optimal hydraulic pressures without constructing the brake caliper 4 and piping in a complicated manner. In addition, in the brake circuit leading to the brake operation lever 2 which has been operated previous to the other brake operation lever 2, hydraulic pressure from the master cylinder 3 is supplied directly to the brake caliper 4. For this reason, the hydraulic pressure modulator 6 in the brake circuit (the electrically-operated actuator included in the brake circuit) can be held in suspension. This enables this brake system to put at least one of the two hydraulic pressure modulators 6 (the electrically-operated actuators included therein) in a suspended condition, thus enabling the electric current consumption to be curbed securely.

In addition, the first electromagnetic on-off valve 7 installed in the main brake line 5 is of normally-open type. This enables the first electromagnetic on-off valve 7 to be put in a non-energized state while the motorcycle is driven under normal conditions or the like. Consequently, from this viewpoint, the electric current consumption of the vehicle can be curbed to a large extent.

It should be noted that the above descriptions have been provided for the brake system that is operating while a braking operation is performed for a relatively short time. This brake system is designed to be shifted to a mode which further suppresses the electric current consumption while a braking operation is performed for a longer time such as while stopping the vehicle on a slope. This mode for suppressing the electric current consumption will be described later.

Descriptions will now be provided for a specific structure and specific functions of the hydraulic pressure modulator 6 with reference to FIGS. 2 to 10.

Figure 3:
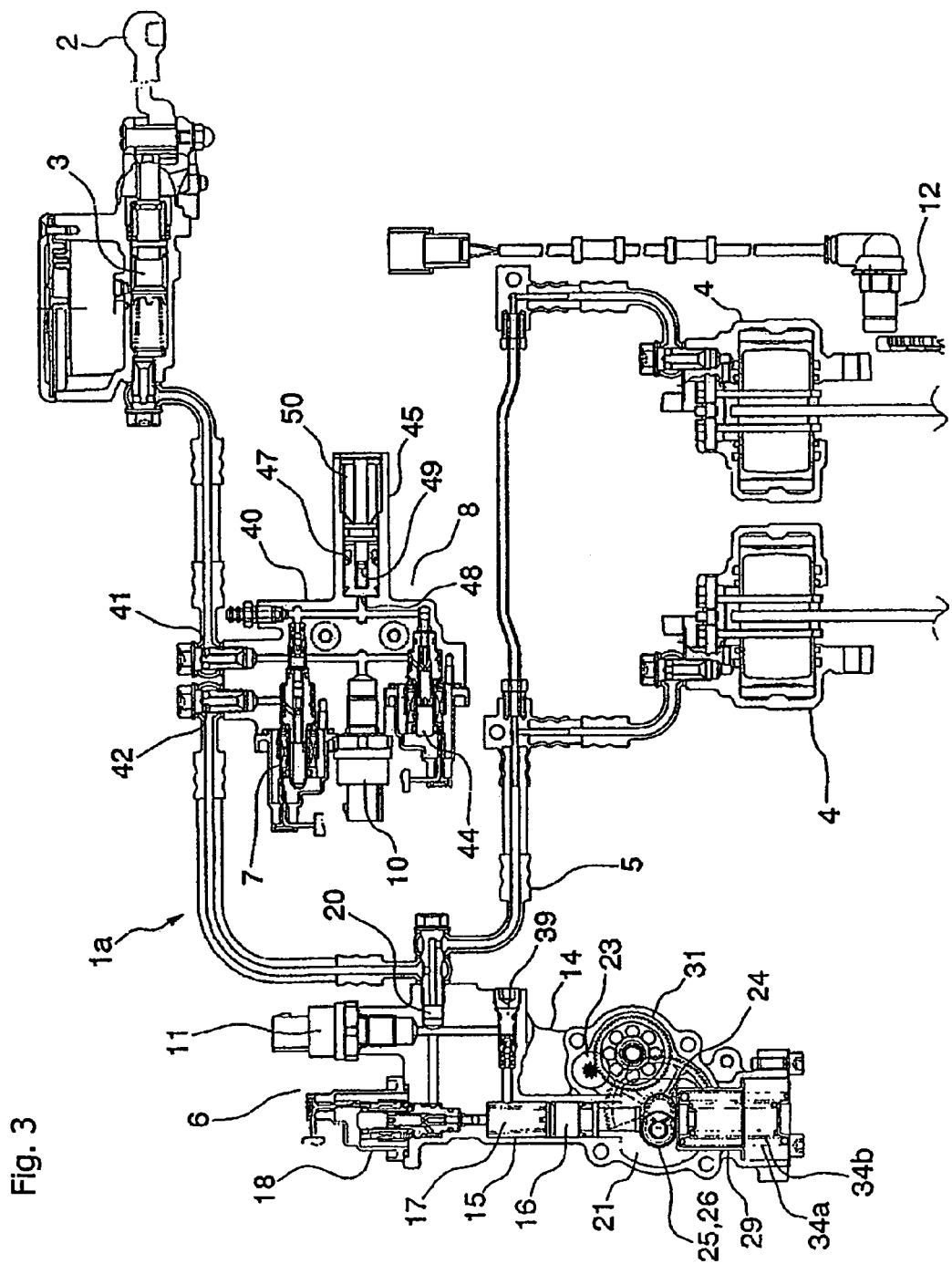
FIG. 3 is a diagram of a braking circuit at a front wheel for the embodiment of FIG. 1 showing hydraulic fluid pathways between braking system components.
Figure 4:
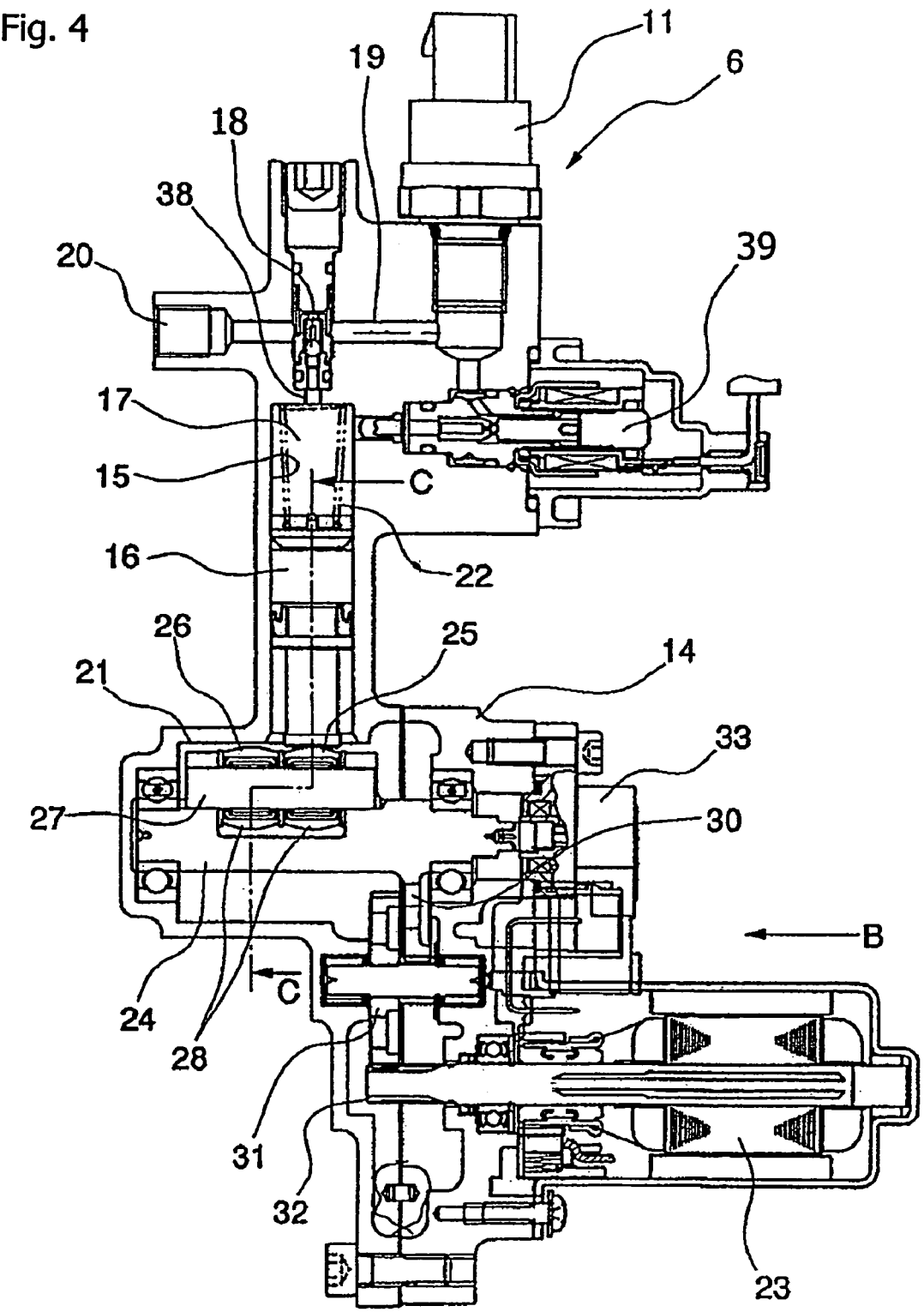
FIG. 4 is an enlarged sectional view of the hydraulic pressure modulator taken along the dashed line A—A in FIG. 5 showing the piston in a neutral position within the hydraulic pressure chamber.
Figure 5:
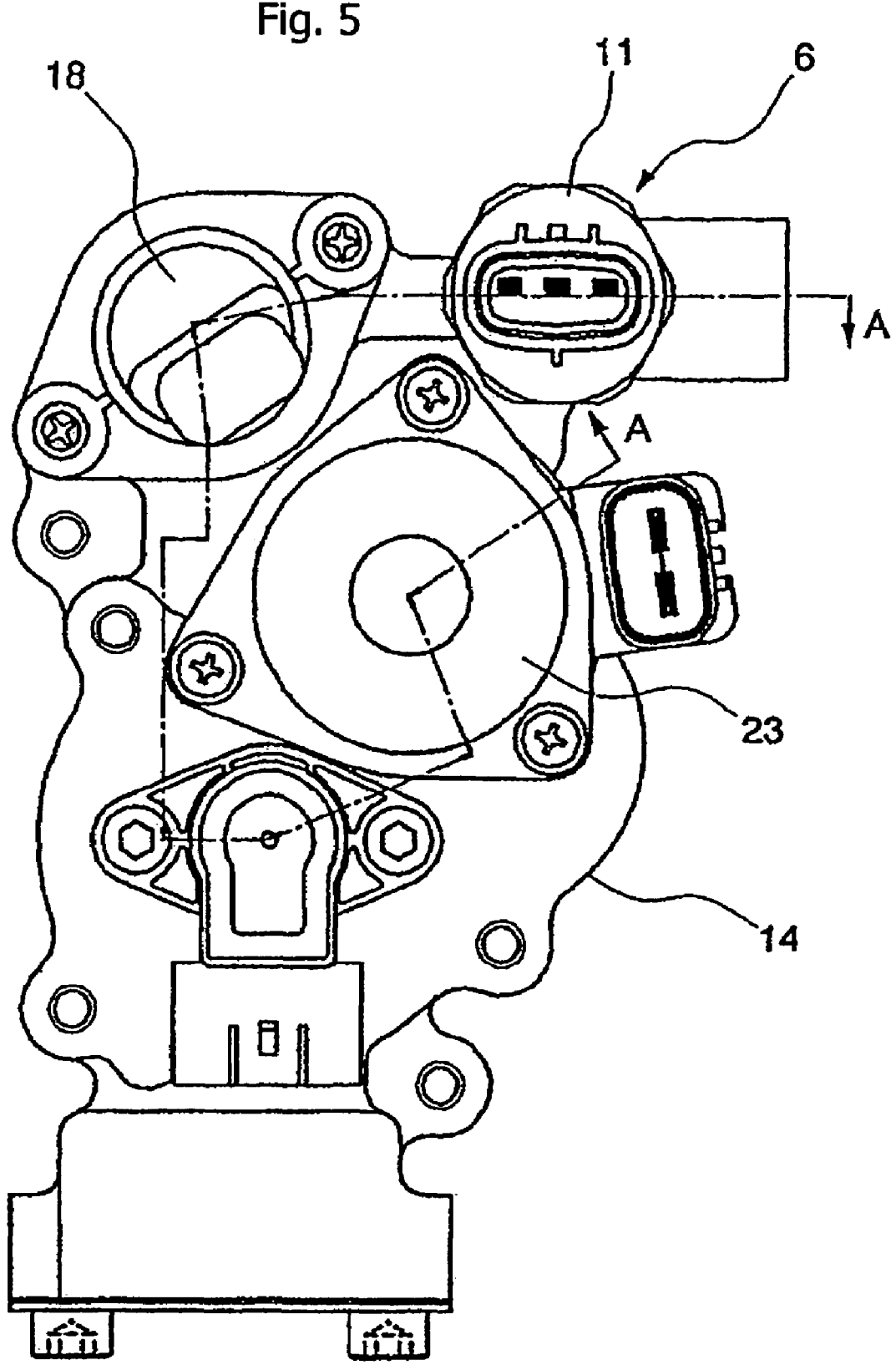
FIG. 5 is a side view of the hydraulic pressure modulator as is seen from the direction of the arrow B in FIG. 4 showing the second electromagnetic on-off valve, the pressure sensor, and the motor lying in parallel.
Figure 9:
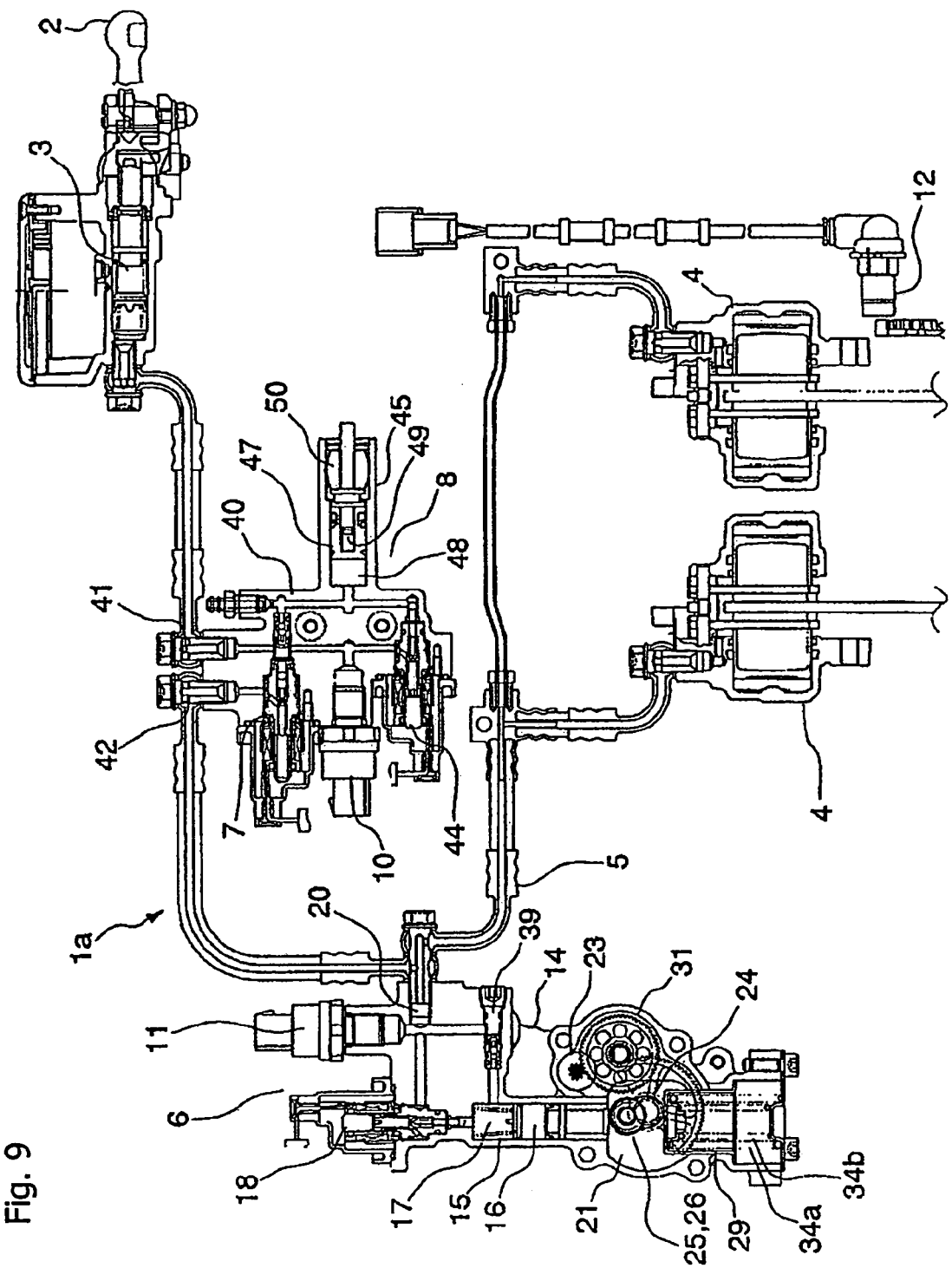
FIG. 9 is a diagram of a braking circuit at a front wheel for the embodiment of FIG. 1 showing hydraulic fluid pathways between braking system components for the braking system in a CBS operation.
Figure 10:
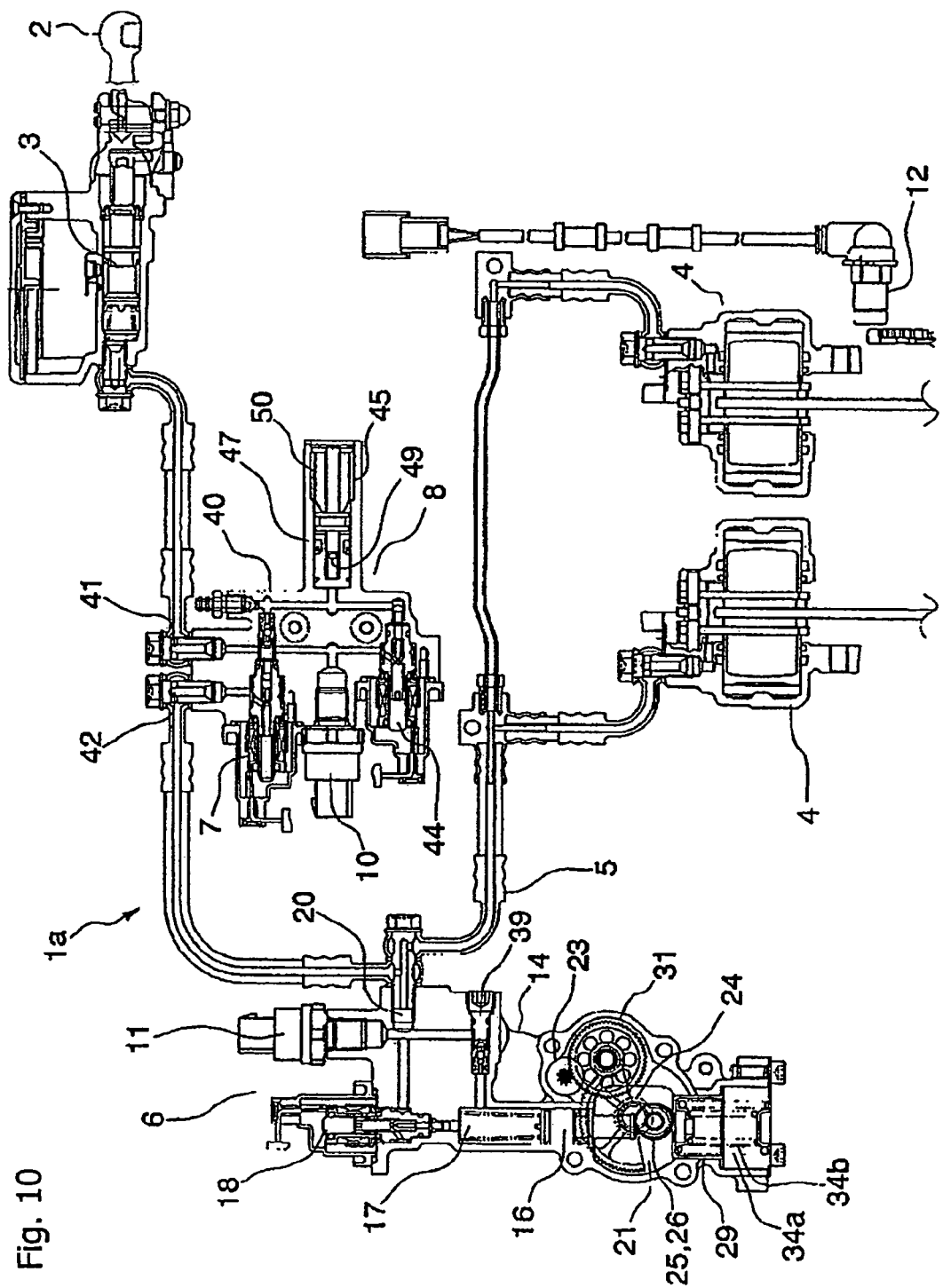
FIG. 10 is a diagram of a braking circuit at a front wheel for the embodiment of FIG. 1 showing hydraulic fluid pathways between braking system components for the braking system in an ABS operation.

As shown in the enlarged, cross-sectional view of the hydraulic pressure modulator 6 in FIG. 4, a piston 16 is housed in a cylinder 15 which has been formed in a modulator body 14 in a way that the piston 16 can move back and forth in the cylinder 15, and a hydraulic fluid chamber 17 is separated by, and formed by, the cylinder 15 and the piston 16. This hydraulic pressure chamber 17 is connected to an output port 20 of the modulator body 14 through a main supply-discharge path 19 in which a second electromagnetic on-off valve 18 of normally-open type is interposed. As shown in FIGS. 3, 9 and 10, this output port 20 is connected to the main brake line 5 so that hydraulic fluid is supplied and discharged between the hydraulic pressure chamber 17 and the main brake line 5 whenever necessary. Incidentally, the hydraulic pressure modulator 6 shown in FIG. 4 and the hydraulic pressure modulator 6 shown in FIGS. 3, 9 and 10 are depicted as having a different internal path connecting from the hydraulic pressure chamber 17 to the main brake line 5. However, this difference is only for the illustrative purposes. Neither the actual structure nor the actual functions are different between the hydraulic pressure modulator 6 shown in FIG. 4 and the hydraulic pressure modulator 6 shown in FIGS. 3, 9 and 10.

Furthermore, as shown in FIG. 4, the hydraulic pressure modulator 6 includes: a cam mechanism 21 for pushing up the piston 16 in the direction of the hydraulic pressure chamber 17; a return spring 22 for always pressing the piston 16 in the direction of the cam mechanism 21; and a electrically-operated motor 23 which serves as an electrically-operated actuator for operating the cam mechanism 21. This electrically-operated motor 23 is designed to be controlled by the controller 9 (see FIG. 1) so that the electrically-operated motor 23 is rotated reversibly.

With regard to the cam mechanism 21, a pair of cam rollers 25 and 26 are provided on the cam shaft 24, which is supported by bearing in the modulator body 14, in a way that the cam rollers 25 and 26 are eccentric to the rotational center of the cam shaft 24. The pair of cam rollers 25 and 26 are rotatably supported by a shaft 27 which is used commonly by the pair of cam rollers 25 and 26, the shaft 27 being provided outside the periphery of the cam shaft 24 in parallel with the cam shaft 24, with needle-shaped roller bearing 28 interposed between the shaft 27 and each of the cam rollers 25 and 26. Consequently, the cam rollers 25 and 26 are arranged outside the periphery of the cam shaft 24 in series in the shaft longitudinal direction. The piston 16 is urged by the return spring 22 so the end of the piston 16 is always forced to abut one cam roller 25. A lifter 29, which will be described later, is made to abut the other cam roller 26.

Moreover, a sector gear 30 is formed to be integral to an extremity of the cam shaft 24. This sector gear 30 is connected to a pinion gear 32 on the output shaft of the electrically-operated motor 23 through a speed reducing gear 31 (see FIG. 4 and FIG. 6(b)). Consequently, rotational torque produced by the electrically-operated motor 23 is transmitted to the cam shaft 24 through engagement of these gears, and the rotational movement of the cam shaft 24 by the torque is transmitted, as operating force, to the piston 16 through the cam roller 25. In addition, an angle sensor 33 is provided to another extremity of the cam shaft 24. The angle sensor 33 is designed to feed back to the controller 9 angle information concerning the cam shaft 24.

The cylinder 15 is divided in two areas by a position almost in the center of the cylinder 15, the position being defined as a neutral reference position. Thereby, operation of the piston 16 is controlled respectively in one and the other of the two divided areas. FIGS. 3, 4, 6(a) and 6(b) show a state which puts the piston 16 at the neutral reference position. While the piston 16 is in this state, the eccentric position of the cam roller 25 on the cam shaft 24 is almost orthogonal to the stroke direction of the piston 16. The electrically-operated motor 23 controls the energizing of the cam roller 25, and thereby controls the rotational movement of the eccentric position of the cam roller 25 so that the eccentric position moves in the up and down directions, as shown in the figures, whenever necessary.

Figures 8A, 8B:
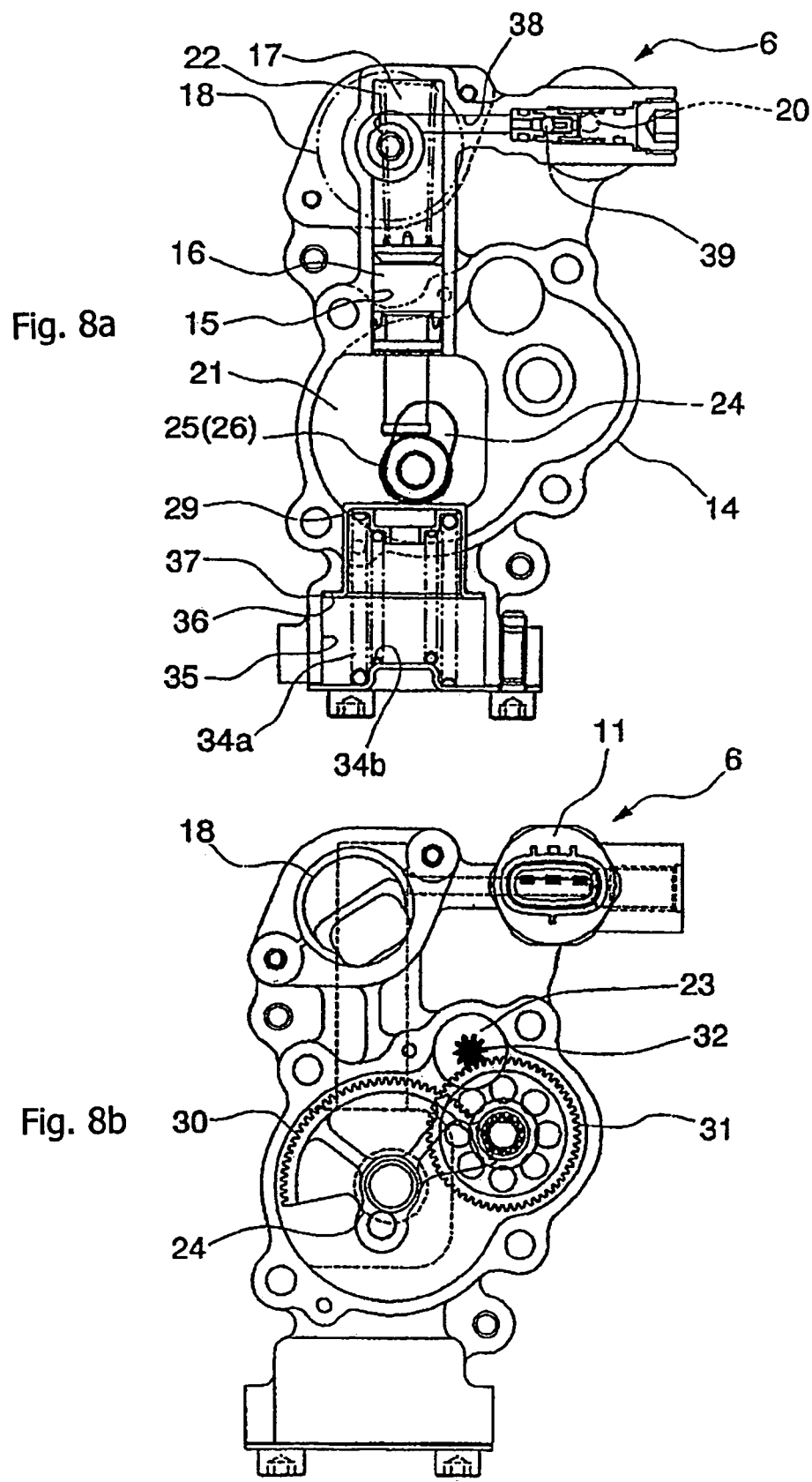
FIG. 8(a) is a sectional view of the hydraulic pressure modulator taken along the dashed line C—C in FIG. 4, showing the hydraulic pressure chamber expanded in sized due to the downward movement of the piston as found when the braking system is under ABS control.
FIG. 8(b) is a side view of the hydraulic pressure modulator of FIG. 8(a) as seen from the direction of the arrow B in FIG. 4, showing a transmission part of an electrically-operated motor.

In the hydraulic pressure modulator 6 according to the present embodiment, one area on the side of the hydraulic pressure chamber 17 which is expanded from the neutral reference position (on the lower side in FIG. 4) is designed to be used for ABS control, while the other area on the side of the hydraulic pressure chamber 17 which is reduced from the neutral reference position (on the upper side in FIG. 4) is designed to be used for CBS control. The ABS performs hydraulic pressure control ranging from the reducing of pressure against the main brake line 5 (the brake caliper 4) to the maintaining of the pressure and the increasing of the pressure once again. For this reason, use of the area on the side of the hydraulic pressure chamber 17 which is expanded by operation of the piston from the neutral reference position is preferable for the control. On the other hand, since the CBS performs hydraulic pressure control to actively supply hydraulic fluid to the main brake line (the brake caliper 4), use of the other area on the side of the hydraulic pressure chamber 17, which is decreased by operation of the piston from the neutral reference position, is preferable for the control. Incidentally, FIGS. 7(a), 7(b) and 9 show conditions where the CBS control is performed, and FIGS. 8(a), 8(b) and 10 show conditions where the ABS control is performed.

In the case of this hydraulic pressure modulator 6, the piston 16 is used for the ABS in one of the two areas into which the hydraulic pressure chamber 17 is divided by the neutral reference position, and the piston 16 is used for the CBS in the other of the two areas. Consequently, this eliminates the necessity of providing two different pistons, one for the ABS and the other for the CBS. Accordingly, in this hydraulic pressure modulator 6, the number of parts is reduced. Furthermore, the modulator itself can be produced in a smaller size and with a lighter weight.

As shown in FIGS. 6 to 8, the lifter 29, which has a closed bottom, and which is shaped like a cylinder, is arranged in a position underneath the other cam roller 26 of the hydraulic pressure modulator 6 so that the lifter 29 can move back and forth. A force is applied to the lifter 29 in the direction of the cam roller 26 by a pair of backup springs 34a and 34b (energizing means) which have been arranged inside the lifter 29. The lifter 29 is arranged in an acceptance hole 35 with a level difference in the modulator body 14. At the opening edge of the lifter 29, a stopper flange 37, which can be made to abut on the step surface 36 of the acceptance hole 35, is formed so that the stopper flange 37 is integrated with the step surface 36. This stopper flange 37, along with the step surface of the acceptance hole 35, constitutes a stopper for controlling a position of the piston 16 to which a force is applied by the backup springs 34a and 34b. This stopper (the stopper flange 37 and the step surface 36) performs control so that a position of the piston 16 to which the maximum of force is applied by the backup springs 34a and 34b is equivalent to the neutral reference position.

The backup springs 34a and 34b apply a force to the piston 16 in the direction which decreases the hydraulic pressure chamber 17. The force applied to the piston 16 is optimally employed mainly while the electrically-operated motor 23 is not energized. The force applied to the piston 16 pushes back the piston position to the neutral reference position where the stopper functions, while the torque of the electrically-operated motor 23 does not function. Incidentally, with regard to the relative forces of the spring reaction forces of the backup springs 34a and 34b as well as the return springs 22, the spring reaction forces of the backup springs 34a and 34b are set to be the larger when the piston 16 is put at the neutral reference position. On one side, a spring reaction force is applied by the springs 34a and 34b to the piston 16 in the direction which returns the piston position to the neutral reference position. On the other side, a spring reaction force is applied by the spring 22 to the piston 16 in the direction which returns the piston position to the neutral reference position.

In addition, as shown in FIG. 4, the modulator body 14 is provided with a bypass path 38 which connects the hydraulic pressure chamber 17 with the output port 20 while bypassing the second electromagnetic on-off valve 18. This bypass path 38 is provided with a check valve 39 which allows the hydraulic fluid to flow in the direction from the hydraulic pressure chamber 17 to the output port 20.

The second electromagnetic on-off valve 18 in the main supply-discharge path 19 is of normally-closed type, and is opened only in the course of the ABS control and the CBS control under which the hydraulic fluid is supplied from the hydraulic pressure modulator 6 to the brake caliper 4. Although the second electromagnetic on-off valve 18 is being controlled in this manner, however, the supply-discharge path 19 is automatically blocked if the second electromagnetic on-off valve 18 is not energized for some reason. In this brake system, even if the second electromagnetic on-off valve 18 is closed in this manner, the flow of the hydraulic fluid in the direction from the hydraulic pressure chamber 17 to the main brake line 5 is secured by use of the bypass path 38 and the check valve 39.

Additionally, in this brake system, each pressure sensor 11 for detecting hydraulic pressure on the output side of the corresponding brake circuit is fitted into the modulator body 14 of the hydraulic pressure modulator 6. The detection part of the sensor is arranged so that the detection part of the sensor faces a position upstream of the second electromagnetic on-off valve 18 (a position in the direction of the output port 20) in the supply-discharge path 19 in the modulator body 14. Consequently, in this brake system, the pressure sensor 11, along with the hydraulic pressure modulator 6, can be arranged in an integrated block in a compact manner, and the hydraulic pressure on the output side of the brake circuit can be detected in a portion closer to the brake caliper 4.

In addition, in the case of the hydraulic pressure modulator 6 according to the present embodiment, the pressure sensor 11, which is a functional component being long in the axial direction, the electrically-operated motor 23 and the second electromagnetic on-off valve 18 are fitted into the modulator body 14 in parallel with one another, as shown in FIGS. 5 to 8. Consequently, the whole of the hydraulic pressure modulator 6 can be compact in size, thus making the hydraulic pressure modulator 6 very advantageous for being mounted onto a vehicle.

Figure 11:
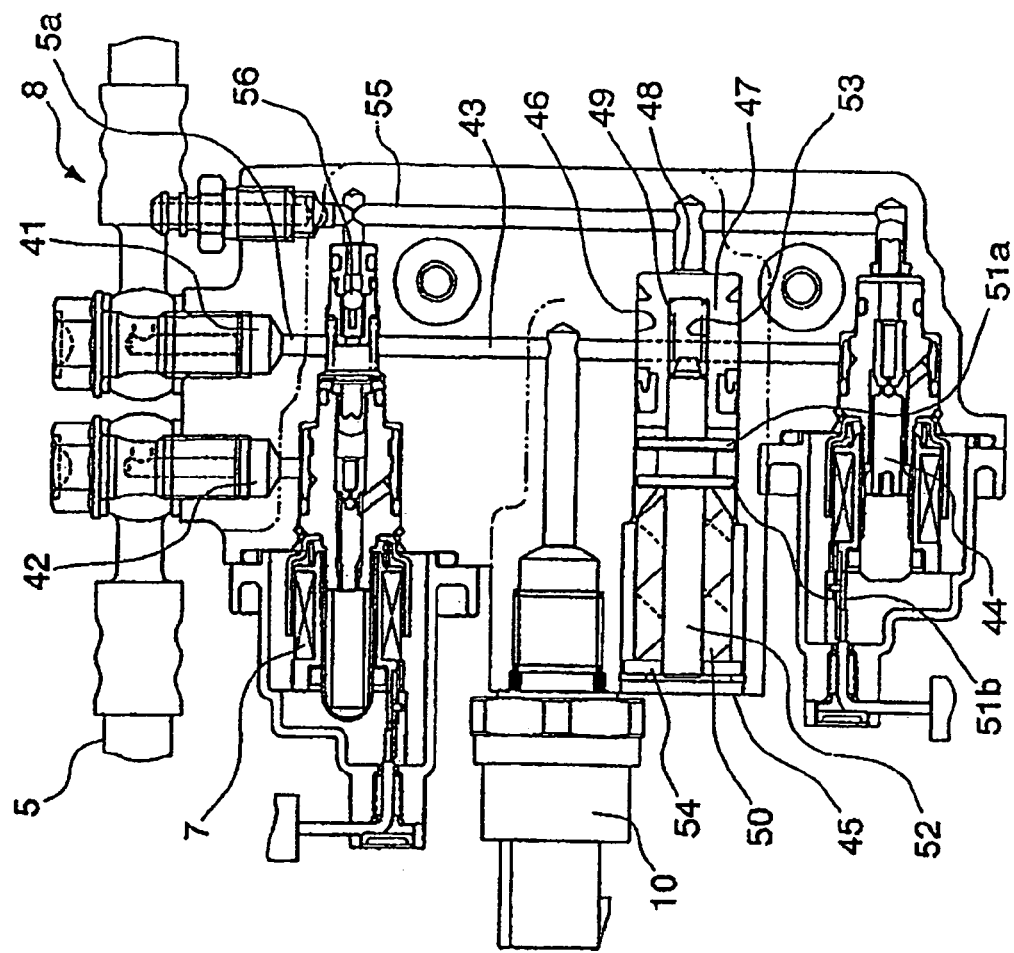
FIG. 11 is a sectional view of a reaction force modulator of the embodiment of FIG. 1.
Figure 12:
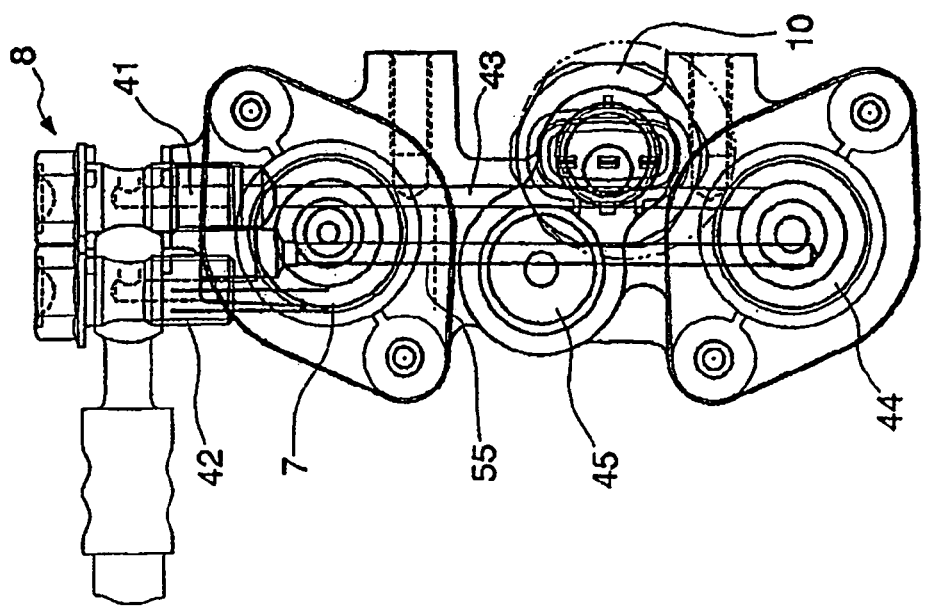
FIG. 12 is a passage arrangement view for the reaction force modulator of FIG. 11 as seen from the direction perpendicular to the section in FIG. 11.

Next, descriptions will be provided for a specific structure of a reaction force modulator 45 with reference to FIGS. 11 and 12. Incidentally, constituent components of the structure shown in FIG. 11 and 12 are illustrated in a direction which is different from a direction in which constituent components of the structure shown FIGS. 3, 9 and 10 are illustrated. This difference is for illustration convenience.

The reaction force modulator 45 is fitted into a channel switch unit 8 shaped like an integrated block. A main brake constituting channel 5a constituting a part of the main brake line 5 is formed in a unit body 40 of this channel switch unit 8. One end of this main brake constituting channel 5a is designed to serve as an inlet port 41 communicating with the master cylinder 3, and the other end of the main brake constituting channel 5a is designed to be serve as an outlet port 42 communicating with the brake caliper 4. In addition, the first electromagnetic on-off valve 7 is integrally fitted into the unit body 40. Accordingly, the on-off operation part of this first electromagnetic on-off valve 7 is designed to open and close the main brake constituting channel 5a.

A branched channel 43 is provided in a position upstream (toward the master cylinder 3) of the first electromagnetic on-off valve 7 in the main brake constituting channel 5a. The reaction force modulator 45 is connected to this branched channel 43 via a third electromagnetic valve 44 which is of the normally-closed type. In common with the first electromagnetic on-off valve 7, the third electromagnetic on-off valve 44 is energized and controlled by the controller 9. While the CBS control is being performed, the third electromagnetic on-off valve 44 causes the master cylinder 3 and the reaction force modulator 45 to communicate with each other in a brake line connecting to a brake operation lever 2 which has been operated subsequent to the other brake operation lever 2. Incidentally, at this time, the first electromagnetic on-off valve 7 is energized, thereby closing the main brake constituting channel 5a.

Furthermore, the pressure sensor 10 on the input side of the brake circuit is provided upstream of the third electromagnetic on-off valve 44 (in the direction of the inlet port 41) in the branched channel 43. This pressure sensor 10 is integrally fitted into the unit body 40, and is arranged so that the pressure detection part of the pressure sensor 10 faces the inside of the branched channel. A portion upstream of the third electromagnetic on-off valve 44 in the branched channel 43 is always connected to the inlet port 41 whether the first electromagnetic on-off valve 7 opens or closes. Thereby, the pressure sensor 10 always can accurately detect the pressure in the vicinity of the master cylinder 3 in the brake circuit.

On the other hand, with regard to the reaction force modulator 45, a piston 47 is housed in a cylinder 46 which has been formed in the unit body 40 so that the piston 47 can move back and forth therein. A fluid chamber 48 to receive hydraulic fluid which has flowed therein from the master cylinder 3 is formed between the cylinder 46 and the piston 47. A metallic coil spring 49 and a deformed plastic resin spring 50 are arranged in series on the back of the piston 47. These two springs 49 and 50 (elastic members) whose properties are different are designed to apply reaction forces to the piston 47.

Moreover, a guide rod 52, having a pair of flanges 51a and 51b located almost in the middle in the axial direction, is arranged in the back of the piston 47 in the cylinder 46. One extremity of the guide rod 52 is inserted into a housing hole 53 which has been formed in the middle of the back of the piston 47, and the other extremity of the guide rod 52 penetrates through the deformed plastic resin spring 50 along the axis center of the deformed plastic resin spring 50. The coil spring 49 is arranged between the housing hole 53 of the piston 47 and the former extremity of the guide rod 52, and is designed to generate a spring reaction force depending on the stroke of the piston 47 until the back of the piston 47 abuts the flange 51a of the guide rod 52. On the other hand, the deformed plastic resin spring 50 is arranged between a thrust washer 54 arranged in the bottom of the cylinder 46 and the other flange 51b of the guide rod 52. The deformed plastic resin spring 50 changes its shape depending on a retracting stroke of the guide rod 52, thereby generating reaction force and damping resistance (internal friction resistance) corresponding to its change in shape. Incidentally, the shape and material of the deformed plastic resin spring 50 are determined depending on desired properties.

Generally, a spring constant of the deformed plastic resin spring 50 is set to be larger than that of the coil spring 49. As a result, the coil spring 49 starts to change its shape earlier than the deformed plastic resin spring 50 while the piston 16 executes a retracting stroke. In addition, the coil spring 49, made of metallic material, has linear spring properties, and the deformed plastic resin spring 50 has hysteresis properties (damping properties). For this reason, in the reaction force modulator 45, reaction force properties with moderate rise can be obtained mainly by use of the coil spring 49 in the initial phase of the retraction of the piston 16. In the final phase of the retraction, reaction force properties with sharp rise accompanying the damping properties can be obtained by use of the deformed plastic resin spring 50.

In the case of this brake system, while the CBS control is performed, in the brake circuit leading to a brake operation lever which has been operated later than the other brake operation lever, hydraulic fluid is introduced into the reaction force modulator 45 from the master cylinder 3. At this time, the reaction force modulator 45 generates the multiple-staged reaction force by use of the two kinds of springs 49 and 50 as described above. Consequently, a braking operation having a smooth feel, which is similar to that given by the direct-operation-type brake system, can be obtained from this brake system, although this brake system has a very simple structure.

In addition, the unit body 40 of the reaction force modulator 45 is provided with a bypass path 55, which bypasses the second electromagnetic on-off valve 44. The bypass path 55 also connects the reaction force modulator 45 to the main brake constituting channel 5a at a portion upstream of the first electromagnetic on-off valve 7. Furthermore, the bypass path 55 is provided with a check valve 56 which allows hydraulic fluid to flow in the direction from the reaction force modulator 45 to the inlet port 41 (in the direction of the master cylinder 3). Consequently, even if the CBS control is released while hydraulic fluid is being introduced into the reaction force modulator 45, the hydraulic fluid in the reaction force modulator 45 is securely returned to the master cylinder 3 through the bypass path 55. Thereby, the piston 47 in the reaction force modulator 45 is returned to the initial position. For this reason, the next time the CBS control is resumed, a similar feeling of braking operation can be obtained.

Moreover, in the present embodiment, along with the reaction force modulator 45, the first electromagnetic on-off valve 7 which opens and closes the main brake line 5 is fitted into the channel switch unit 8. The first electromagnetic on-off valve 7 and the reaction force modulator 45 can be in a compact size as an integrated block. Furthermore, in the present embodiment, in addition to the first electromagnetic on-off valve 7 being fitted into the channel switch unit 8, the pressure sensor 10 on the input side and the third electromagnetic on-off valve 44 are also fitted into the same channel switch unit 8. This increases a degree of agglomeration of the functional components, and these functional components become advantageous for being mounted onto the vehicle.

In addition, in the aforementioned channel switch unit 8, the first and the second electromagnetic on-off valves 7 and 44, which are long in the axial direction, and the pressure sensor 10 are fitted into the unit body 40 so that the first and the third electromagnetic on-off valves 7 and 44 and the pressure sensor 10 are all in parallel with the reaction force modulator 45. This is advantageous for making the channel switch unit 8 itself in a compact size.

Furthermore, in the channel switch unit 8, the first electromagnetic on-off valve 7 is arranged forward in the axial direction, while the third electromagnetic on-off valve 44 is arranged backward in the axial direction. The channel from the inlet port 41 to the third electromagnetic on-off valve 44 (parts of the main brake constituting channel 5a and the branched channel 43) is formed in a straight line. This brings is advantageous since it is easy to manufacture the channel.

Based on the descriptions of the aforementioned components, a description will now be provided for operation of the whole of the brake system. In the following description, it is assumed that the mode changing switch 13 is in a mode which allows the CBS.

While the vehicle is driven, if the rider operates one of the front wheel brake operation lever 2 and the rear wheel brake operation lever 2 earlier than the other, all of the first to third electromagnetic on-off valves 7, 44 and 18 remain non-energized, and hydraulic pressure to be generated in the master cylinder 3 is supplied directly to the brake caliper 4 in the brake circuit which has been operated earlier than the other.

Meanwhile, in the brake circuit which has been operated later than the other, all of the first to third electromagnetic on-off valves 7, 44 and 18 are energized. The main brake line 5 is cut off from the master cylinder 3 by the first electromagnetic on-off valve 7. Simultaneously, the master cylinder 3 and the reaction force modulator 45 are connected with each other by an opening operation of the second electromagnetic on-off valve 44. In addition, the hydraulic pressure modulator 6 and the main brake line 5 are connected with each other by an opening operation of the second electromagnetic on-off valve 18. This enables the rider to receive braking operation feel which has been reproduced artificially by the reaction force modulator 45. At the same time, fluctuation in hydraulic pressure due to operation of the hydraulic pressure modulator 6 is not transmitted to the rider. At this point, simultaneously with this, the electrically-operated motor 23 of the hydraulic pressure modulator 6 is operated, and the cam roller 25 pushes up the piston 16, thereby pressurizing hydraulic fluid in the hydraulic fluid chamber 17. As a result, hydraulic pressure in response to control by the electrically-operated motor 23 is supplied to the brake caliper 4 through the main brake line 5.

It should be noted that hydraulic pressure to be supplied from the hydraulic pressure modulator 6 to the brake caliper 4 is controlled in order to cause the hydraulic pressures of the front and rear wheels to satisfy a distribution ratio which has been set in advance. Furthermore, in this type of CBS control, if it is detected that a wheel on the side of the modulator which is operating is about to lock, the piston 16 is retracted by control of the electrically-operated motor 23 by the controller 9, thus reducing the braking pressure of the brake caliper 4. In this manner, the locking of the wheel is avoided.

Furthermore, in the brake circuit which has been operated earlier than the other brake circuit, if it is detected that the wheel is about to lock, the controller 9 causes the first electromagnetic on-off valve 7 to operate so that the communicative connection the master cylinder 3 and the brake caliper 4 is blocked. Simultaneously with this, the controller 9 causes the second electromagnetic on-off valve 18 to operate so that the hydraulic pressure modulator 6 is connected to the main brake line 5. In addition, the piston 16 is retracted from the neutral reference position by control of the electrically-operated motor 23. Thus, the controller 9 starts the ABS control. Thereby, braking pressure of the brake caliper 4 is reduced, and the locking of the wheel is avoided. Incidentally, at this time, the third electromagnetic on-off valve 44 in the channel switch unit 8 is closed, and the communicative connection the master cylinder 3 and the reaction force modulator 45 is blocked.

When the ABS control is started in this manner, and the piston 16 in the hydraulic pressure modulator 6 is retracted, eccentric rotation of the cam roller 25 on the cam shaft 24 compresses the backup springs 34a and 34b by means of the lifter 29. During a regular ABS operation, the uplifting operation of the piston 16 from this state is normally performed by power of the electrically-operated motor 23. However, if the electrically-operated motor 23 is not energized during the ABS control for some reason, the piston 16 is returned to the neutral reference position by forces of the backup springs 34a and 35b, and hydraulic fluid which has been withdrawn in the hydraulic pressure chamber 17 is returned to the main brake line 5. In addition, if the second electromagnetic on-off valve 18 is not energized simultaneously with this, the main supply-discharge path 19 in the hydraulic pressure modulator 6 is closed. However, hydraulic fluid in the hydraulic pressure chamber 17 is returned to the main brake line 5 through the bypass path 38 and the check valve 39.

Furthermore, once the vehicle is slowed through this series of braking operations, hydraulic pressure of the master cylinder 3 due to the rider's input functions on one wheel, and hydraulic pressure of the hydraulic pressure modulator 6 functions on the other wheel. However, when a certain length of time has passed after the vehicle slows, the hydraulic pressure modulator 6 (the electrically-operated motor 23) is shifted to the aforementioned electric current suppression mode which suspends the operation of the hydraulic pressure modulator 6 (the electrically-operated motor 23).

In this electric current suppression mode, first of all, the second electromagnetic on-off valve 18 of the hydraulic pressure modulator 6, which is pressurizing the brake caliper 4, is stopped from being energized. This suspends the operation of the electrically-operated motor 23 while the communicative connection the modulator 6 and the main brake line 5 is being blocked. At this time, hydraulic pressure which has been generated in the hydraulic pressure modulator 6 remains in the main brake line 5 and the brake caliper 4. Thereby, braking force is maintained by the hydraulic pressure.

Subsequently, the first and third electromagnetic on-off valves 7 and 44 in the channel switch unit 8 are stopped from being energized. Thereby, first of all, the third electromagnetic on-off valve 44 is caused to close so that the communicative connection the master cylinder 3 and the reaction force modulator 45 is blocked. Simultaneously, the first electromagnetic on-off valve 7 is caused to open, thereby causing the master cylinder 3 and the brake caliper 4 of the main brake line 5 to connect to each other. At this time, hydraulic pressure which has been generated in the hydraulic pressure modulator 6 remains in the main brake line 5. Thereby, the stroke on the side of the master cylinder 3 is maintained as it is.

The operation mode is shifted to the electric current suppression mode through this sequence. Thereby, the braking operation can be switched to braking operation to be performed by the master cylinder 3 while giving no feel of raggedness to the rider. In addition, even if the operation of the electrically-operated motor 23 is suspended in this manner, braking force is maintained securely, thus enabling no electricity to be consumed by the electrically-operated motor 23. Furthermore, wear, abrasion and the like of the motor brushes of the electrically-operated motor 23 can be reduced. Simultaneously, the electrical current consumption in each of the electromagnetic on-off valves 7, 44 and 18 can be curbed.

In addition, when the rider subsequently releases the braking operation, hydraulic fluid is returned from the brake caliper 4 to the master cylinder 3. Simultaneously, hydraulic fluid which remains in the reaction force modulator 45 is returned to the master cylinder 3 through the bypass path 55 and the check valve 56. In addition, the controller 9 causes the second electromagnetic on-off valve 18 to open when the hydraulic pressure on the input side of the brake circuit comes to be equal to the atmospheric pressure. Simultaneously, the controller 9 causes the electrically-operated motor 23 to operate so that the piston 16 in the hydraulic pressure modulator 6 is retracted to the neutral reference position.

The basic operations of this brake system have been described above. Conditions for starting the CBS control can be restricted by the controller 9 depending on an amount of braking operation (hydraulic pressure on the input side of the brake circuit), a vehicle speed and the like. For example, the CBS control may not be performed whereas each of the front and the rear wheels is braked only by hydraulic pressure of the master cylinder 3, while an amount of braking operation is smaller. In addition, the aforementioned CBS control by use of the hydraulic pressure modulator 6 may be performed, only while the amount of braking operation is larger than a certain level. Furthermore, if the front and rear wheel brakes are operated to a large extent at a time, the CBS may not be performed whereas the front and rear wheels are braked by hydraulic pressure of the master cylinder 3, thereby suppressing the electric current consumption.

Additionally, in the case of the brake system according to the present embodiment, a plurality of modes of control by the controller 9 are available, and the rider can choose an arbitrary mode of control by manual operation of the mode changing switch 13.

Control modes which have been set in advance are as follows, for example.

(1) a sport mode: This is a mode of control in which the CBS control is performed only when the front wheel brake is operated. When the rear wheel brake is operated, braking operation only by use of hydraulic pressure of the master cylinder is performed.

(2) a touring mode: This is a mode of control in which the CBS control is performed when any one of the front wheel brake and the rear wheel brake is operated.

(3) a conventional mode: This is a mode of control in which braking operation only by use of hydraulic pressure of the master cylinder is performed when any one of the front wheel brake and the rear wheel brake is operated.

In this brake system, the rider can switch these modes of control from one to another whenever necessary depending on an environment where the vehicle is used, driving conditions of the vehicle and the like. Thereby, control which matches the rider's choice of braking operation can be pursued.

In addition, with regard to modes of control to be set in advance, a mode of control in which a distribution of hydraulic pressure between the front and rear wheel brakes depending on an amount of braking operations is fixed and a mode of control which has different conditions for starting the CBS control may be set in addition to the aforementioned control modes.

Figure 13:
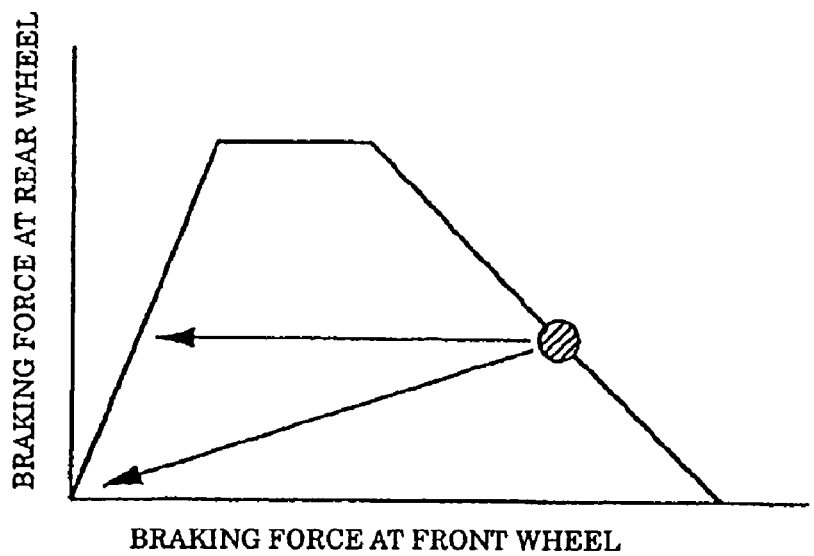
FIG. 13 is a braking force distribution characteristic view for front and rear wheels when a braking operation is performed to a front wheel in the embodiment of FIG. 1.
Figure 13A:
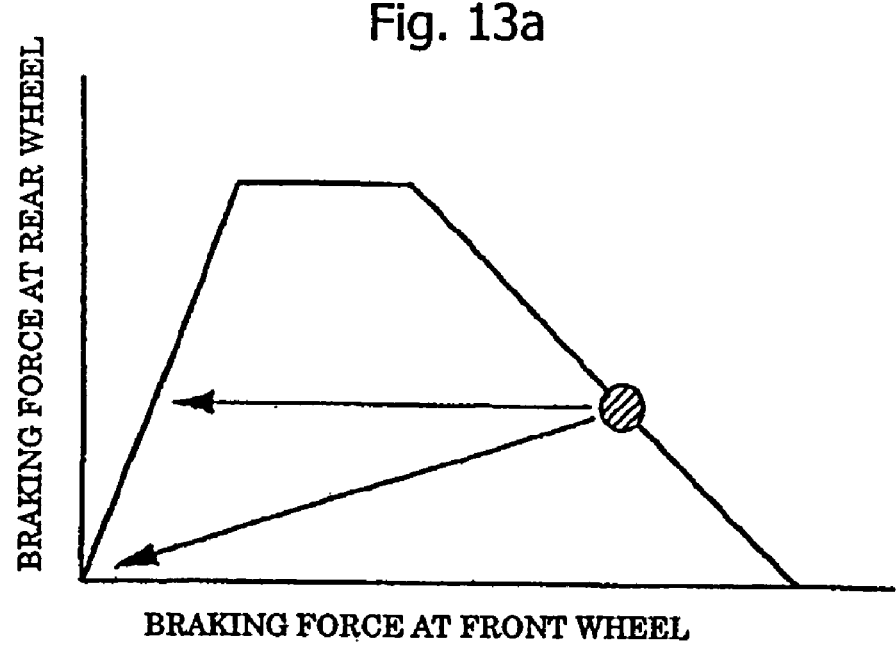

In this brake system, in a case where the CBS control, which causes the rear wheel to move in response to a braking operation of the front wheel, is performed, a ratio of distribution of braking force of the front wheel to the rear wheel is designed to be different for a time when the front wheel braking force is increased (an amount of braking operation is increased) and for a time when the front wheel braking force is decreased (an amount of braking operation is decreased), as shown in FIG. 13.

Specifically, when the front wheel braking force is increased, hydraulic pressure is controlled so that the rear wheel braking force is increased gradually until the increased amount of the front wheel braking force reaches a certain level. Thereafter, the hydraulic pressure is controlled so that the rear wheel braking force is maintained at a constant level temporarily until the increased amount of the front wheel braking force reaches a set value. Thereafter, the hydraulic pressure is controlled so that the rear wheel braking force is decreased gradually after the increased amount of the front wheel braking force exceeds the set value. Under the conditions that the front wheel braking force is increased in this manner, the rear wheel braking force is controlled in this manner, thereby enabling braking efficiency in the initial phase of braking operation to be enhanced and inhibiting a reduction in vertical load of the rear wheel.

On the other hand, when the front wheel braking force is decreased, hydraulic pressure is controlled so that the rear wheel braking force is maintained as it is or is decreased gradually in response to the decrease of the front wheel braking force when the front wheel braking force goes under the set value (see arrows in FIG. 13). Under the conditions that the front wheel braking force is decreased in this manner, the rear wheel braking force is prevented from being increased gradually so that increase in the slip ratio of the rear wheel is avoided, thereby providing the rider a braking operation having a smooth feel.

In this brake system, the braking force of the rear wheel is electrically controlled, thereby enabling the aforementioned control to be performed quickly and with high accuracy.

In addition, descriptions have been provided for the case where the rear wheel braking force is controlled so that the rear wheel braking force is maintained or reduced while the rider decreases the front wheel braking force. However, the time for which the braking operation of the rear wheel is performed, that is, the braking duration, can be controlled when the rider decreases the front wheel braking force.

Furthermore, with regard to this brake system, in a case where the CBS control which causes the rear wheel to move in response to a braking operation of the front wheel is performed, reduction in the vertical load of the rear wheel is judged as described below. Thereafter, distribution of braking force to the rear wheel is designed to be controlled so as to suppress reduction of the vertical load of the rear wheel.

Specifically, in this brake system, the reduction in the vertical load of the rear wheel is designed to be judged from a speed at which the vehicle runs, a hydraulic pressure to be supplied to the front wheel, and slip ratios of the front and rear wheels to be shown when an braking operation of the front wheel is performed. The amount of reduction of the vertical load of the rear wheel can be estimated for each vehicle (depending on the wheel base and the center of gravity of each vehicle) on a basis of the relationship between a vehicle speed and a braking force of the front wheel. In the present embodiment, however, in order to exclude conditions which make both the front and rear wheels slip similarly, an additional condition is considered. Specifically, it is judged whether the slip ratio of the front wheel is equal to, or lower than, a set value $\lambda_a$ and the slip ratio of the rear wheel is equal to, or higher than, another set value $\lambda_b$.

Figure 14:
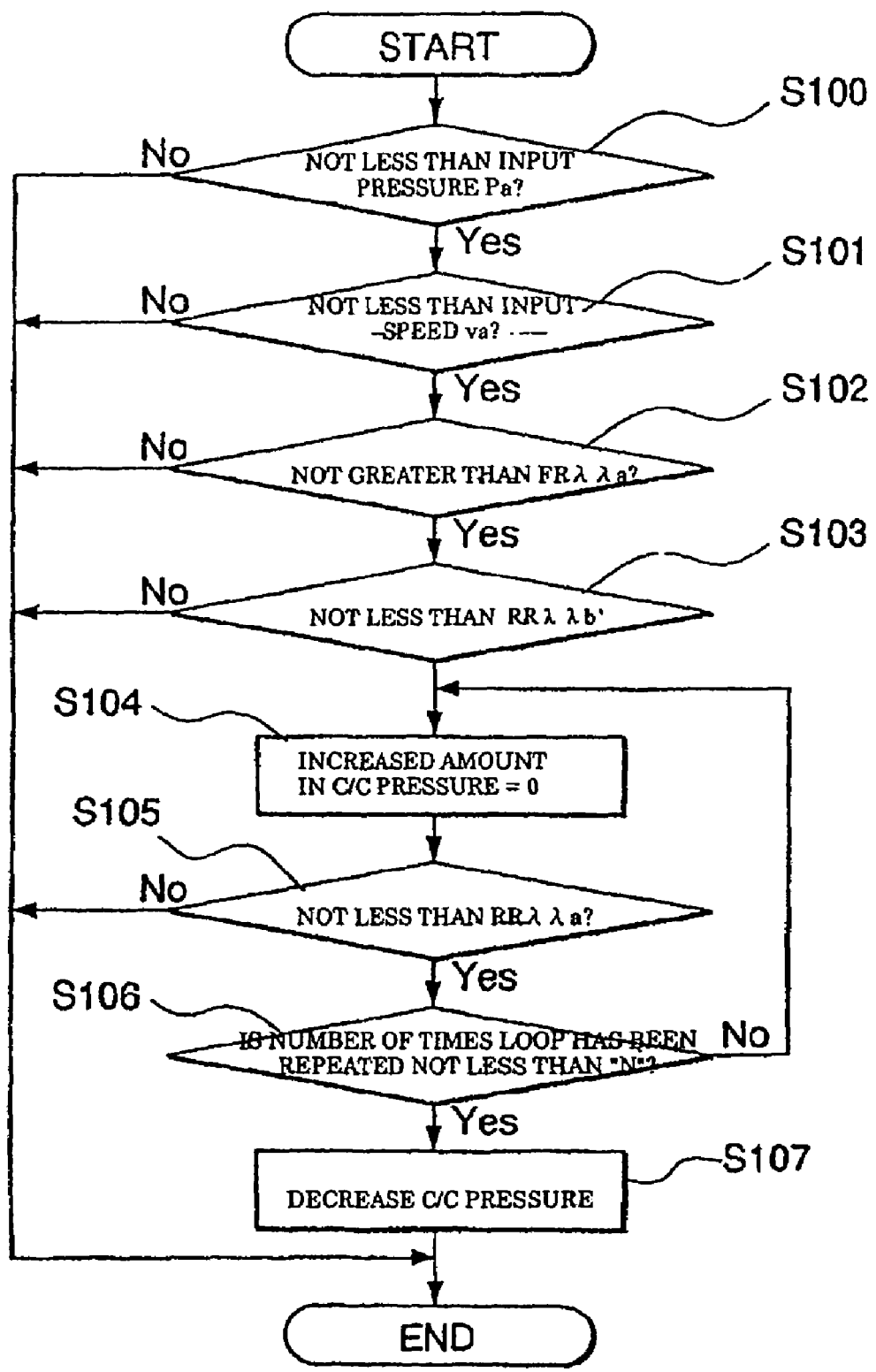
FIG. 14 is a flowchart showing the process for suppression of reduction of the rear wheel contact load as performed by the controller.

In this brake system, specifically, the reduction of the vertical load of the rear wheel is suppressed, for example, by performing the process shown in FIG. 14. FIG. 14 is a flowchart showing the process for suppression of reduction of the rear wheel contact load as performed by the controller.

In this process, it is judged in step 100 whether or not hydraulic pressure in the front wheel brake circuit is no less than a set pressure Pa, and it is judged in step 101 whether or not the vehicle speed is no less than a set speed va. If both conditions are satisfied, it is judged in step 102 whether or not the slip ratio of the front wheel is no more than, $\lambda_a$. If the slip ratio of the front wheel is no more than, $\lambda_a$, then it is judged in the following step 103 whether or not the slip ratio of the rear wheel is no more than, $\lambda_b$. If all of the four conditions are satisfied, it is determined that the vertical load of the rear wheel has started reducing. Accordingly, the present braking pressure of the rear wheel is maintained as it is in step 104, and it is judged in the following step 105, again, whether or not the slip ratio of the rear wheel is no less than, $\lambda_b$. If it is determined in step 105 that the slip ratio of the rear wheel is smaller than $\lambda_b$, the following steps are passed through (proceeds to the end). On the contrary, if it is determined that the slip ratio of the rear wheel is no less than, $\lambda_b$, it is judged in the following step 106 whether or not the number of times this loop of steps has been repeated is no less than a number N. If the number of repetitions does not reach N, the process returns to step 104, where the number of repetition is increased by one. In a case where this loop has been repeated N times (in other words, in a case where the slip ratio has still not become smaller than $\lambda_b$ after a predetermined lapse of time), the braking pressure of the rear wheel is reduced in step 107.

Figure 15:
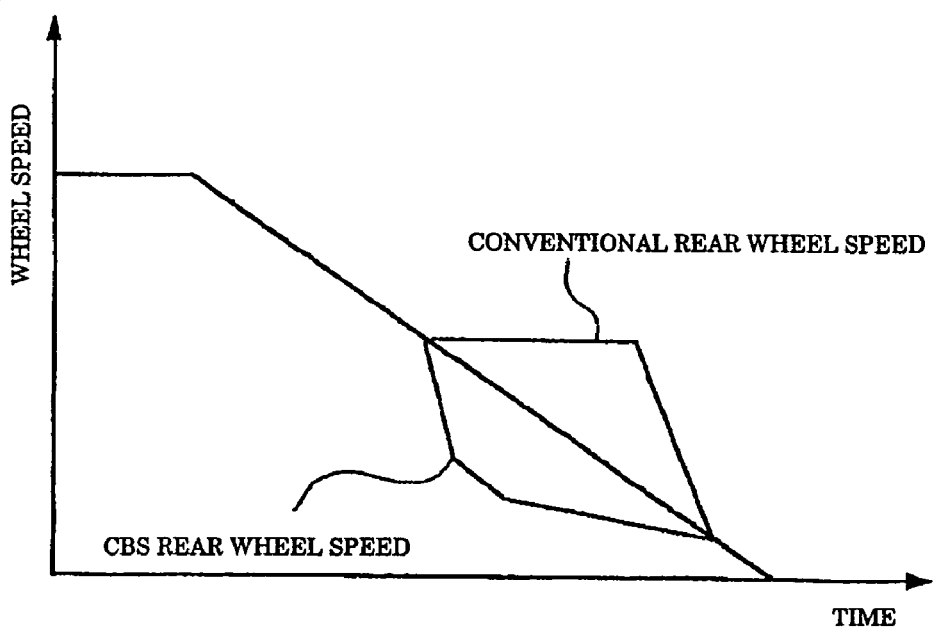
FIG. 15 is a rear wheel speed characteristic view comparing a brake system employing a CBS and that not employing a CBS, when a braking operation for a front wheel is performed.

Consequently, in this brake system, the control as described above prevents the vertical load of the rear wheel from continuing to decrease when the braking operation of the front wheel is performed. Incidentally, FIG. 15 shows comparative changes in speed of the rear wheel between a braking operation only by the front wheel and a braking operation by a CBS control to be performed when a braking operation of the front wheel is operated. In a conventional arrangement for detecting the vertical load of a rear wheel to be adopted for a brake system which does not have the CBS, it is determined that the vertical load of the rear wheel has been reduced when the deceleration gradient of the rear wheel starts to decrease. On the contrary, in a brake system for which the CBS is adopted, the deceleration gradient will not become smaller, even if the vertical load of the rear wheel decreases. For this reason, conventional techniques have not been applied as it is for the brake system for which CBS is adopted. However, in the brake system according to the present embodiment, decrease in the vertical load of the rear wheel can be determined accurately in the aforementioned manner.

In addition, with regard to this brake system, when a CBS control which causes the front wheel to move in response to the braking operation of the rear wheel is performed, a distribution of braking force to the front wheel is designed to be controlled as follows.

Figure 16:
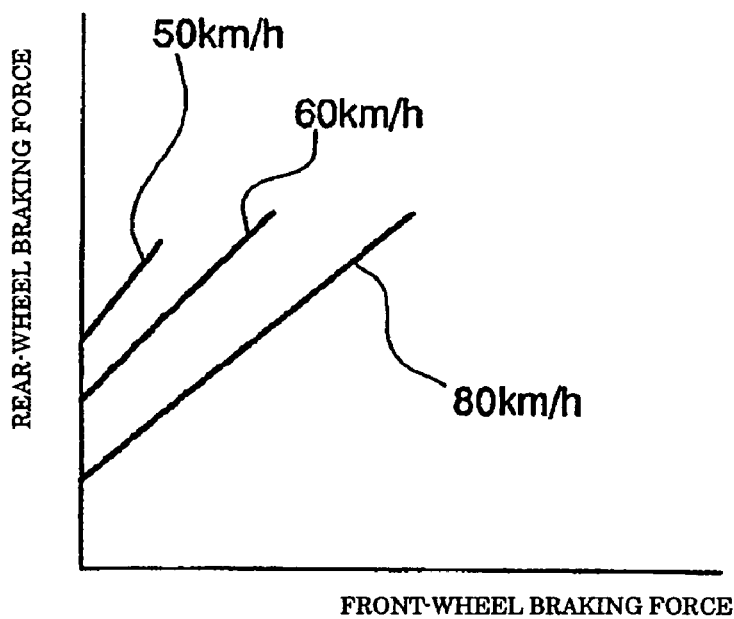
FIG. 16 is a braking force characteristic view for the front and rear wheels when a braking operation for a rear wheel is performed in the embodiment of FIG. 1.

Specifically, as shown in FIG. 16, characteristics of distribution of braking force of the front wheel to the rear wheel have been determined in advance for each vehicle speed of 50 km/h, 60 km/h and 80 km/h. When the braking operation of the rear wheel is started, the front wheel braking force is designed to be controlled from beginning to end by use of the distribution characteristics depending to a speed at which the vehicle is driven at the time the braking operation of the rear wheel is started. Thereby, if an amount of braking operation of the rear wheel remains constant, braking force corresponding to a certain distribution ratio is caused to function on the front wheel until the vehicle pulls up. With regard to the characteristics of distribution of braking force which have been determined in advance for each vehicle speed of 50 km/h, 60 km/h and 80 km/h, when the vehicle-speed is, for example, 50 km/h, the front wheel braking force is maintained at zero until the rear wheel braking force (hydraulic pressure) reaches a certain value. After the rear wheel braking force has exceeded the certain value, the front wheel braking force increases in response to the increase in the rear wheel braking force. It is preferable that a point at which the distribution of braking force to the front wheel is started and a ratio of distribution of braking force to the front wheel be designed to increase respectively as the vehicle speed increases to 60 km/h, and to 80 km/h. Furthermore, if the vehicle speed is lower than a certain speed (for example, 50 km/h), no braking force is distributed to the front wheel.

Figure 17:
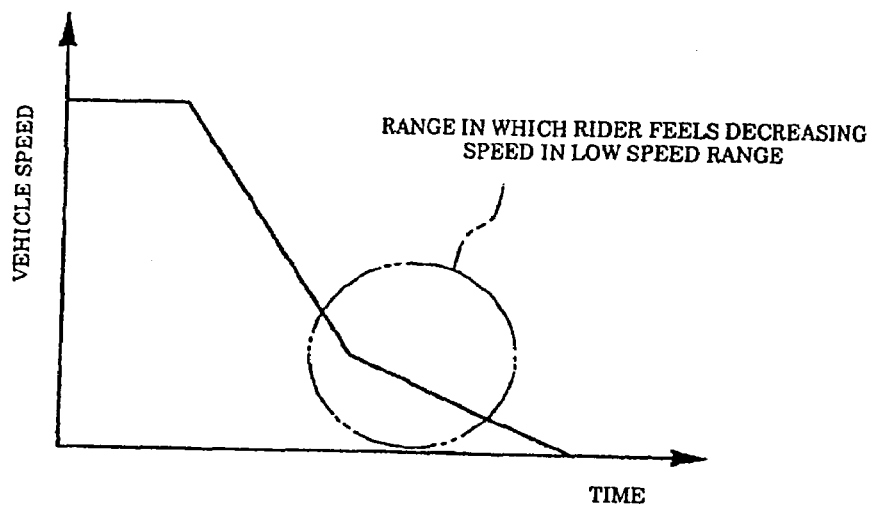
FIG. 17 is a vehicle speed decrement characteristic view when a braking operation for a rear wheel is performed in a prior art braking system, for a comparative example.

In the case of this brake system, when the CBS control of the rear wheel braking operation is performed, the braking force of the front wheel is designed to be controlled from beginning to end by use of characteristics of distribution of braking force corresponding to a speed at which the vehicle is driven when the braking operation is started. Accordingly, even if the rear wheel braking operation is performed while the vehicle is driven at high speed, deceleration gradient as shown in FIG. 17 will not abruptly change in the middle of the gradient. Consequently, the rider who is performing a braking operation does not perceive raggedness during the operation.

Furthermore, with regard to this brake system, when a braking operation is performed while the vehicle is driven at high speed, distribution of braking force to the front wheel becomes larger, thereby enhancing the braking efficiency. By contrast, when a braking operation is performed while the vehicle is driven at low speed, the distribution of braking force to the front wheel becomes smaller, and even becomes null. Thereby, braking force of the front wheel will not adversely affect the driving while the vehicle is driven through among other motor vehicles.

It should be noted that the characteristics of distribution of braking force, which have been determined in advance for each vehicle speed, are not limited to ones shown in FIG. 16, and that the characteristics are arbitrary. The characteristics may be set so that distribution of braking force to the front wheel is increased sharply after an amount of braking operation (braking force) of the rear wheel exceeds a certain value for each of vehicle speeds. In this case, quicker braking efficiency can be obtained when braking operation or the like for a sudden stop of the vehicle is performed.

While a working example of the present invention has been described above, the present invention is not limited to the working example described above, but various design alterations may be carried out without departing from the present invention as set forth in the claims.

We claim:

1. A brake system for a motorcycle, comprising:
   a brake operating lever;
   a master cylinder operable in response to actuation of the braking actuation member;
   a wheel braking mechanism operable to apply a braking force to a wheel by hydraulic pressure operation;
   a main brake line connecting the master cylinder to the wheel braking mechanism;
   a hydraulic pressure modulator operable to generate hydraulic pressure corresponding to driving conditions and a braking operation of the motorcycle, and for modulating a supply of hydraulic pressure to the main brake line and discharging the hydraulic pressure from the main brake line, the hydraulic pressure modulator being connected in fluid communication with the main brake line;
   an electromagnetic on-off valve which is provided in the main brake line, the electromagnetic on-off valve controlling fluid flow between the master cylinder and the wheel braking mechanism; and
   a reaction force modulator operable to cause pseudo reaction force against the hydraulic pressure to function on the master cylinder corresponding to an amount of operation of the brake operation lever while the electromagnetic on-off valve closes the main brake line,
   wherein the reaction force modulator comprises:
      a fluid chamber for receiving hydraulic fluid which has flowed therein from the master cylinder;
      a piston which constitutes one of the walls of the fluid chamber; and
      a plurality of elastic members, each elastic member of the plurality of elastic members having a unique characteristic, wherein each of the plurality of elastic members is operable to actively apply a force to the piston in a direction which causes the piston to reduce the volume of the fluid chamber during all operating conditions, and wherein the plurality of elastic members comprise both spring members having linear spring characteristics and spring members having hysteresis characteristics.

2. The brake system for a motorcycle according to claim 1, wherein the plurality of elastic members comprise both spring members made of metallic material and spring members made of plastic resin material.

3. The brake system for a motorcycle of claim 1, wherein the spring constant of the spring member having linear spring characteristics is smaller than that of the spring member having hysteresis characteristics.

4. The brake system for a motorcycle of claim 1, wherein the reaction force modulator is operable to generate a multiple-stage reaction force, the reaction force corresponding to the specific characteristics of the elastic members, the elastic members being arranged in series.

5. The brake system for a motorcycle of claim 1, wherein the reaction force modulator is enclosed within a housing, and wherein the housing also encloses the electromagnetic on off valve and a hydraulic pressure sensor, and wherein the reaction force modulator, the electromagnetic on-off valve, and the hydraulic pressure sensor are oriented within the housing so as to lie in parallel.

6. The brake system for a motorcycle of claim 1, wherein the hydraulic pressure modulator comprises:
   a cylinder;
   a second piston housed within the cylinder;
   a hydraulic fluid chamber formed between the second piston and the cylinder, the hydraulic fluid chamber in fluid communication with the main brake line so that hydraulic fluid passes between the hydraulic fluid chamber and the main brake line; and
   an electrically-operated actuator,
   wherein the actuator is operatively connected to the second piston so as to displace the piston within the cylinder such that when the piston is moved to decrease the size of the hydraulic fluid chamber hydraulic pressure is generated.

7. The brake system of claim 6, wherein the second piston comprises a neutral reference position located generally at the mid portion of the cylinder, and wherein
   when the second piston is displaced within the cylinder so as to decrease the volume of the hydraulic fluid chamber, the braking system acts as a combined braking system (CBS), and
   when the second piston is displaced within the cylinder so as to increase the volume of the hydraulic fluid chamber, the braking system acts as an anti-lock braking system (ABS).

8. The brake system of claim 1, wherein the hydraulic pressure modulator comprises an electrically operated actuator operatively connected to a hydraulic cylinder so as to generate hydraulic pressure for operation of the wheel braking mechanism.

9. The brake system of claim 8, wherein braking system further comprises an electronic control unit, at least one hydraulic pressure sensor, and a wheel speed sensor, wherein the electronic control unit controls the electrically operated actuator based on input from the at least one hydraulic pressure sensor, the wheel speed sensor, and the timing of and amount of actuation of the brake operation lever.

10. A brake system for a motorcycle, comprising:
a brake operation lever;
a master cylinder operable in response to actuation of the brake operation lever;
wheel braking mechanism operable to apply a braking force to a wheel by hydraulic pressure operation;
a main brake line connecting the master cylinder to the wheel braking mechanism;
a hydraulic pressure modulator operable to cause an electrically-operated actuator to generate hydraulic pressure corresponding to driving conditions and a braking operation of the vehicle, and for supplying the hydraulic pressure to the main brake line and discharging the hydraulic pressure from the main brake line, the hydraulic pressure modulator being merged and connected with the main brake line;
an electromagnetic on-off valve which is provided in a position located toward the master cylinder from a portion in the main brake line where the main brake line and the hydraulic pressure modulator are merged and connected with each other, the electromagnetic on-off valve controlling communication and cutoff between the master cylinder and the wheel braking mechanism; and
a pseudo reaction force generating apparatus for generating a pseudo reaction force against the hydraulic pressure to function on the master cylinder corresponding to an amount of operation of the brake operation lever while the electromagnetic on-off valve closes the main brake line,
wherein the pseudo reaction force generating apparatus comprises:
a fluid chamber for receiving hydraulic fluid which has flowed therein from the master cylinder;
a piston which constitutes one of the walls of the fluid chamber and
a plurality of elastic members, each elastic member of the plurality of elastic members having a unique characteristic, wherein each of the plurality of elastic members is operable to actively apply a force to the piston in a direction which causes the piston to reduce the volume of the fluid chamber during all operating conditions, and wherein the plurality of elastic members comprise both spring members having linear spring characteristics and spring members having hysteresis characteristics,
wherein a path through which the master cylinder the pseudo reaction force generating apparatus are connected with each other is provided with a second electromagnetic on-off valve for opening and closing the path depending on driving conditions and a braking operation of the motorcycle, and
wherein a bypass path which bypasses the second electromagnetic on-off valve is provided between the pseudo reaction force generating apparatus and the master cylinder, and the bypass path is provided with a check valve which allows hydraulic fluid to flow in a direction from the pseudo reaction force generating apparatus to the master cylinder.

11. The brake system for a motorcycle according to claim 10,
wherein the pseudo reaction force generating apparatus and the second electromagnetic on-off valve are provided in an integrated block.

12. The brake system for a motorcycle of claim 10, wherein the plurality of elastic members are configured to provide a multiple-stage reaction force to the piston.

13. The brake system for a motorcycle of claim 10, wherein the hydraulic pressure modulator comprises:
a cylinder;
a second piston housed within the cylinder;
a hydraulic fluid chamber formed between the second piston and the cylinder, the hydraulic fluid chamber in fluid communication with the main brake line so that hydraulic fluid passes between the hydraulic fluid chamber and the main brake line; and
the electrically-operated actuator,
wherein the actuator is operatively connected to the second piston so as to displace the piston within the cylinder such that when the piston is moved to decrease the size of the hydraulic fluid chamber hydraulic pressure is generated.

14. The brake system of claim 13, wherein the second piston comprises a neutral reference position located generally at the mid portion of the cylinder, and wherein
when the second piston is displaced within the cylinder so as to decrease the volume of the hydraulic fluid chamber, the braking system acts as a combined braking system (CBS), and
when the second piston is displaced within the cylinder so as to increase the volume of the hydraulic fluid chamber, the braking system acts as an anti-lock braking system (ABS).

* * * * *